US012668540B2

(12) United States Patent
Burgess, IV

(10) Patent No.: US 12,668,540 B2
(45) Date of Patent: Jun. 30, 2026

(54) COMPOSITIONS OF STEEL-MICROFIBER REINFORCED ULTRA HIGH PERFORMANCE CONCRETE (UHPC) USING RECYCLED GLASS POWDER AND PROCESSES FOR MAKING THE SAME

(71) Applicant: INTEGRATED COMPOSITE CONSTRUCTION SYSTEMS, Manassas, VA (US)

(72) Inventor: Richard Archie Burgess, IV, Manassas, VA (US)

(73) Assignee: Integrated Composite Construction Systems, LLC, Manassas, VA (US)

( * ) Notice: Subject to any disclaimer, the term of this patent is extended or adjusted under 35 U.S.C. 154(b) by 48 days.

(21) Appl. No.: 18/484,456

(22) Filed: Oct. 11, 2023

(65) Prior Publication Data

US 2024/0043327 A1     Feb. 8, 2024

Related U.S. Application Data

(63) Continuation-in-part of application No. PCT/US2022/031480, filed on May 28, 2022.

(60) Provisional application No. 63/343,103, filed on May 18, 2022.

(51) Int. Cl.
| | |
|---|---|
| *C04B 18/08* | (2006.01) |
| *C04B 14/02* | (2006.01) |
| *C04B 14/06* | (2006.01) |
| *C04B 14/32* | (2006.01) |
| *C04B 16/06* | (2006.01) |
| *C04B 18/14* | (2006.01) |
| *C04B 18/167* | (2023.01) |
| *C04B 20/00* | (2006.01) |
| *C04B 103/30* | (2006.01) |

(52) U.S. Cl.
CPC .......... *C04B 18/082* (2013.01); *C04B 14/026* (2013.01); *C04B 14/06* (2013.01); *C04B 14/324* (2013.01); *C04B 16/0625* (2013.01); *C04B 18/146* (2013.01); *C04B 18/167* (2013.01); *C04B 20/006* (2013.01); *C04B 2103/302* (2013.01)

(58) Field of Classification Search
CPC ..... C04B 18/082; C04B 14/026; C04B 14/06; C04B 14/324; C04B 16/0625; C04B 18/146; C04B 18/167; C04B 20/006; C04B 2103/302; C04B 7/527; C04B 2201/52; C04B 28/04; C04B 14/48; Y02W 30/91
See application file for complete search history.

(56) References Cited

U.S. PATENT DOCUMENTS

2021/0371347 A1 * 12/2021 Darling ............... C04B 40/0608

FOREIGN PATENT DOCUMENTS

| WO | WO-2022146935 A1 * | 7/2022 | ............. E04C 3/294 |
|---|---|---|---|
| WO | WO-2022251722 A1 * | 12/2022 | ............. C04B 7/527 |

* cited by examiner

*Primary Examiner* — Anthony J Green
(74) *Attorney, Agent, or Firm* — JUNEAU & MITCHELL; Todd L. Juneau

(57) ABSTRACT

The invention relates to processes for making steel-microfiber reinforced ultra high performance concrete using recycled glass powder and articles made from the same. The invention includes a process of mixing first dry constituents of fine aggregate and cement to yield a first dry mix, followed by mixing with second dry constituents consisting of 2.5-6.0 micron recycled glass powder, silica fume, silica flour, cenospheres, and optionally microinclusions to obtain a UHPC dry mix, followed by adding water only, with further mixing, then adding a superplasticizer admix and a water-reducing admix to obtain ultra high performance concrete paste, followed by adding steel microfibers that are 13 mm×0.2 mm.

17 Claims, 12 Drawing Sheets

FIGURE 1

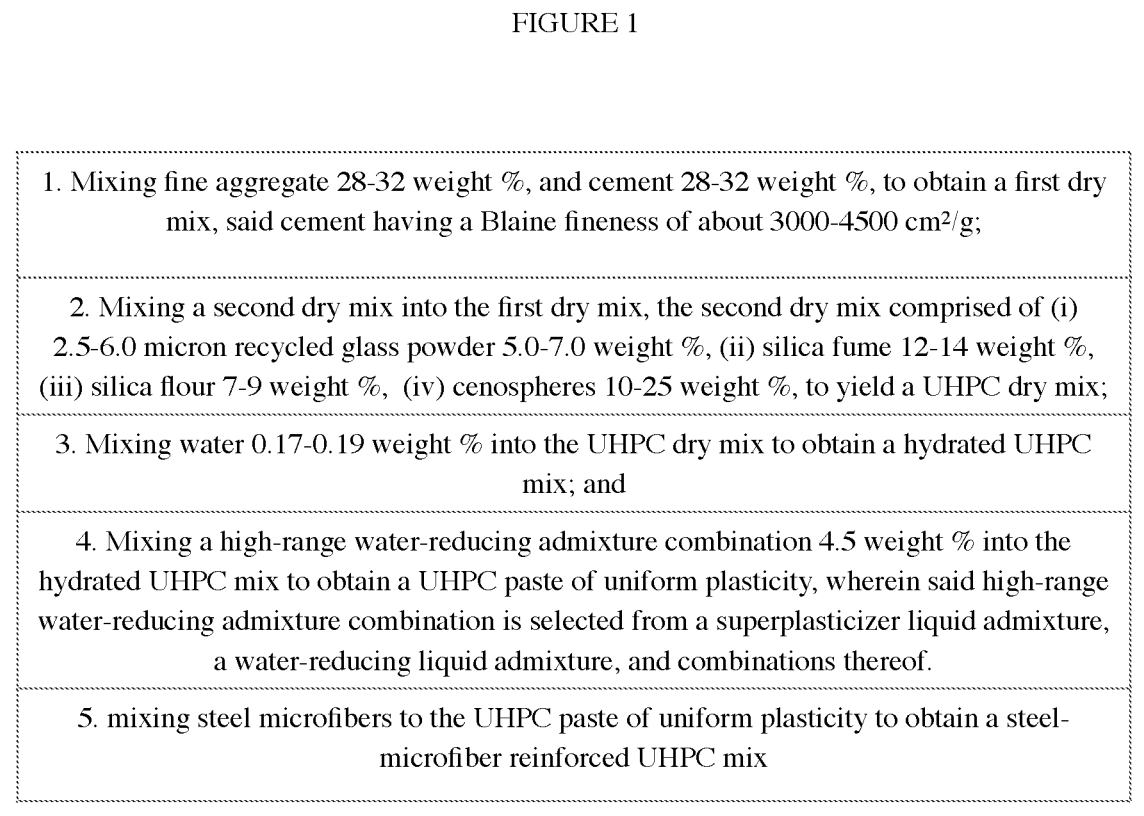

1. Mixing fine aggregate 28-32 weight %, and cement 28-32 weight %, to obtain a first dry mix, said cement having a Blaine fineness of about 3000-4500 cm$^2$/g;

2. Mixing a second dry mix into the first dry mix, the second dry mix comprised of (i) 2.5-6.0 micron recycled glass powder 5.0-7.0 weight %, (ii) silica fume 12-14 weight %, (iii) silica flour 7-9 weight %,  (iv) cenospheres 10-25 weight %, to yield a UHPC dry mix;

3. Mixing water 0.17-0.19 weight % into the UHPC dry mix to obtain a hydrated UHPC mix; and 4. Mixing a high-range water-reducing admixture combination 4.5 weight % into the hydrated UHPC mix to obtain a UHPC paste of uniform plasticity, wherein said high-range water-reducing admixture combination is selected from a superplasticizer liquid admixture, a water-reducing liquid admixture, and combinations thereof.

5. mixing steel microfibers to the UHPC paste of uniform plasticity to obtain a steel-microfiber reinforced UHPC mix

FIGURE 2

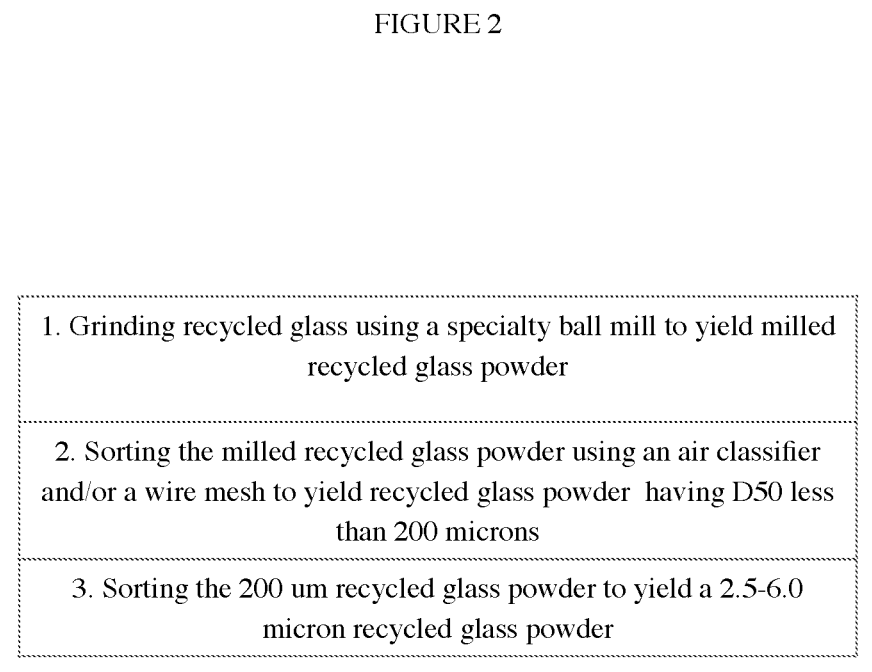

1. Grinding recycled glass using a specialty ball mill to yield milled recycled glass powder 2. Sorting the milled recycled glass powder using an air classifier and/or a wire mesh to yield recycled glass powder having D50 less than 200 microns 3. Sorting the 200 um recycled glass powder to yield a 2.5-6.0 micron recycled glass powder

FIGURE 3

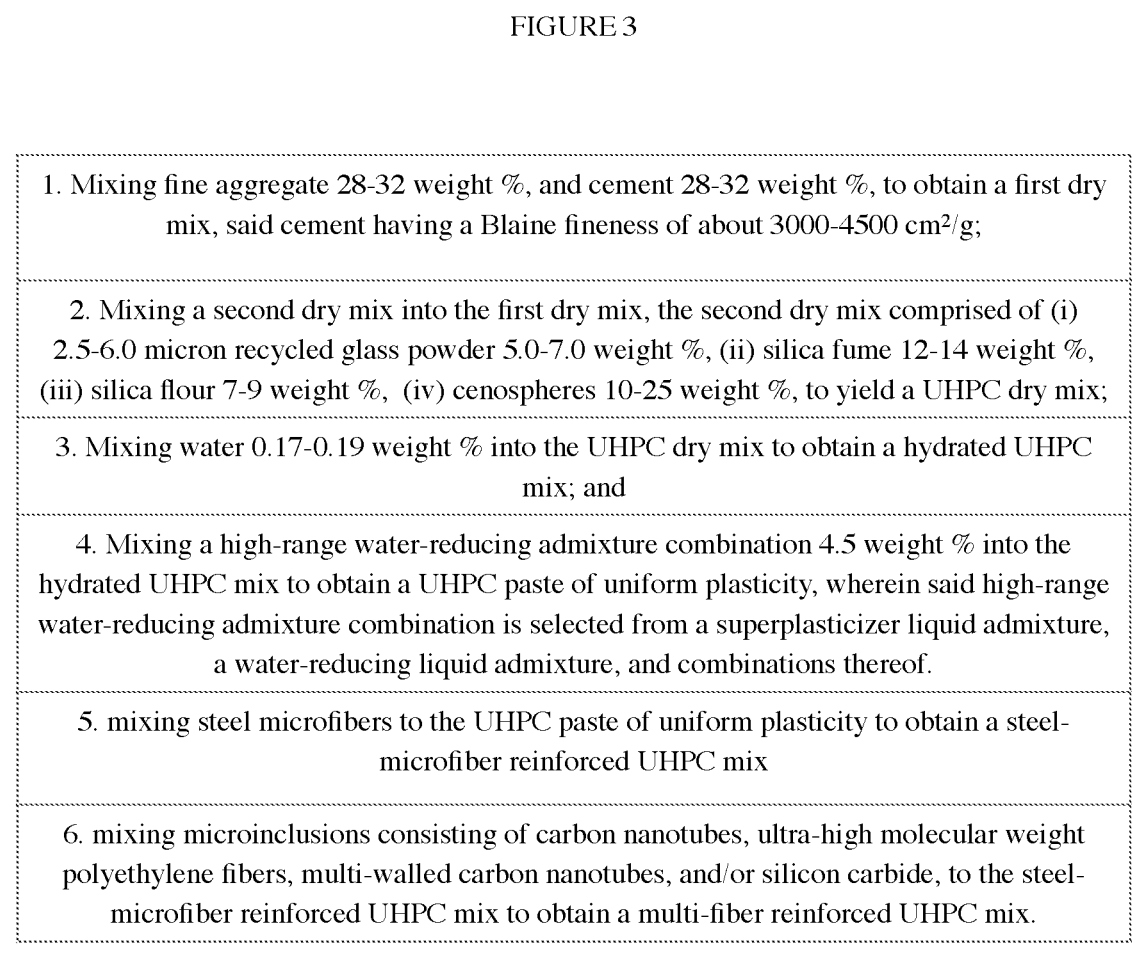

1. Mixing fine aggregate 28-32 weight %, and cement 28-32 weight %, to obtain a first dry mix, said cement having a Blaine fineness of about 3000-4500 cm²/g;

2. Mixing a second dry mix into the first dry mix, the second dry mix comprised of (i) 2.5-6.0 micron recycled glass powder 5.0-7.0 weight %, (ii) silica fume 12-14 weight %, (iii) silica flour 7-9 weight %, (iv) cenospheres 10-25 weight %, to yield a UHPC dry mix;

3. Mixing water 0.17-0.19 weight % into the UHPC dry mix to obtain a hydrated UHPC mix; and 4. Mixing a high-range water-reducing admixture combination 4.5 weight % into the hydrated UHPC mix to obtain a UHPC paste of uniform plasticity, wherein said high-range water-reducing admixture combination is selected from a superplasticizer liquid admixture, a water-reducing liquid admixture, and combinations thereof.

5. mixing steel microfibers to the UHPC paste of uniform plasticity to obtain a steel-microfiber reinforced UHPC mix 6. mixing microinclusions consisting of carbon nanotubes, ultra-high molecular weight polyethylene fibers, multi-walled carbon nanotubes, and/or silicon carbide, to the steel-microfiber reinforced UHPC mix to obtain a multi-fiber reinforced UHPC mix.

Figure 4:
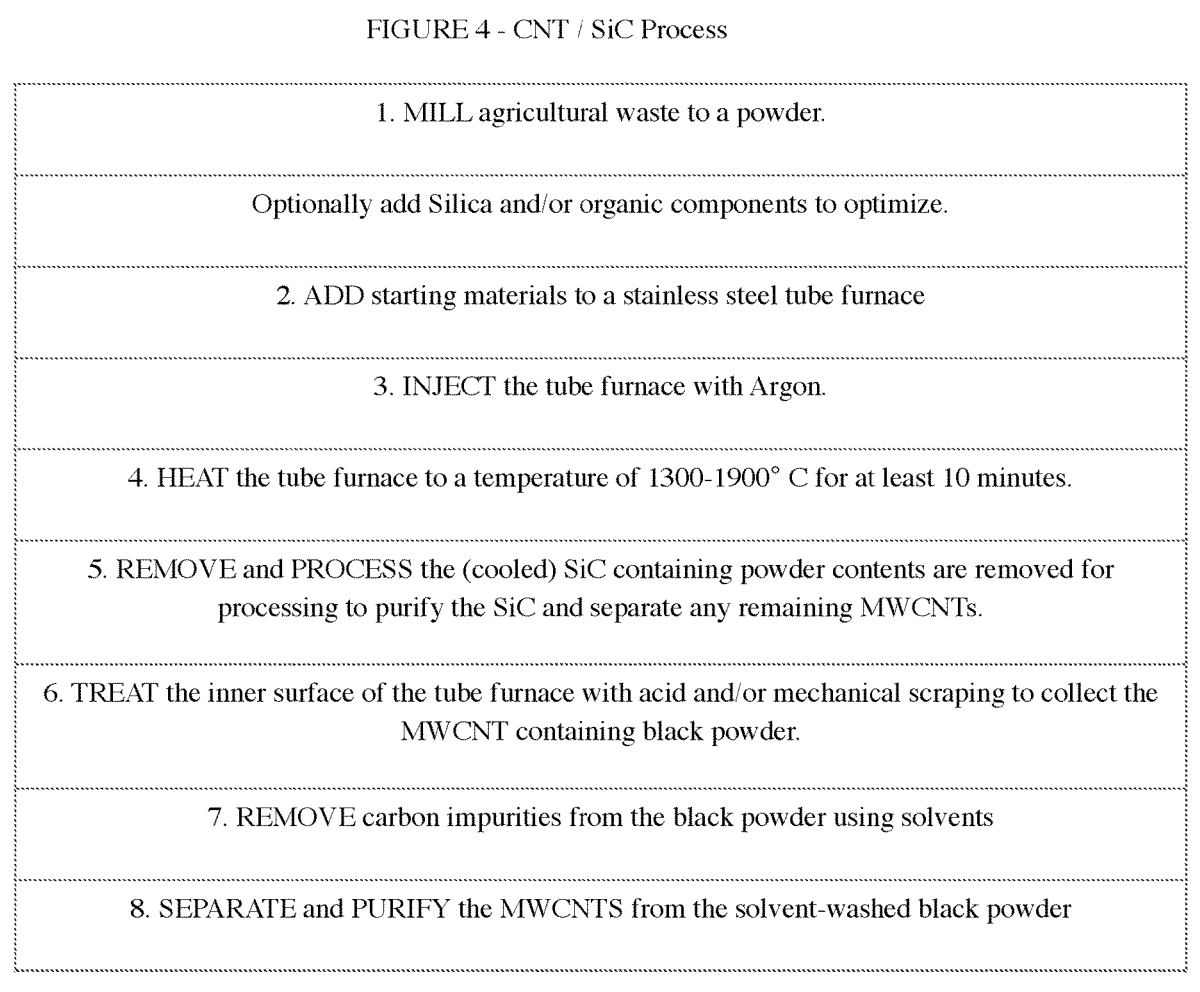

FIGURE 4 - CNT / SiC Process

| |
|---|
| 1. MILL agricultural waste to a powder. |
| Optionally add Silica and/or organic components to optimize. |
| 2. ADD starting materials to a stainless steel tube furnace |
| 3. INJECT the tube furnace with Argon. |
| 4. HEAT the tube furnace to a temperature of 1300-1900° C for at least 10 minutes. |
| 5. REMOVE and PROCESS the (cooled) SiC containing powder contents are removed for processing to purify the SiC and separate any remaining MWCNTs. |
| 6. TREAT the inner surface of the tube furnace with acid and/or mechanical scraping to collect the MWCNT containing black powder. |
| 7. REMOVE carbon impurities from the black powder using solvents |
| 8. SEPARATE and PURIFY the MWCNTS from the solvent-washed black powder |

Figure 5:
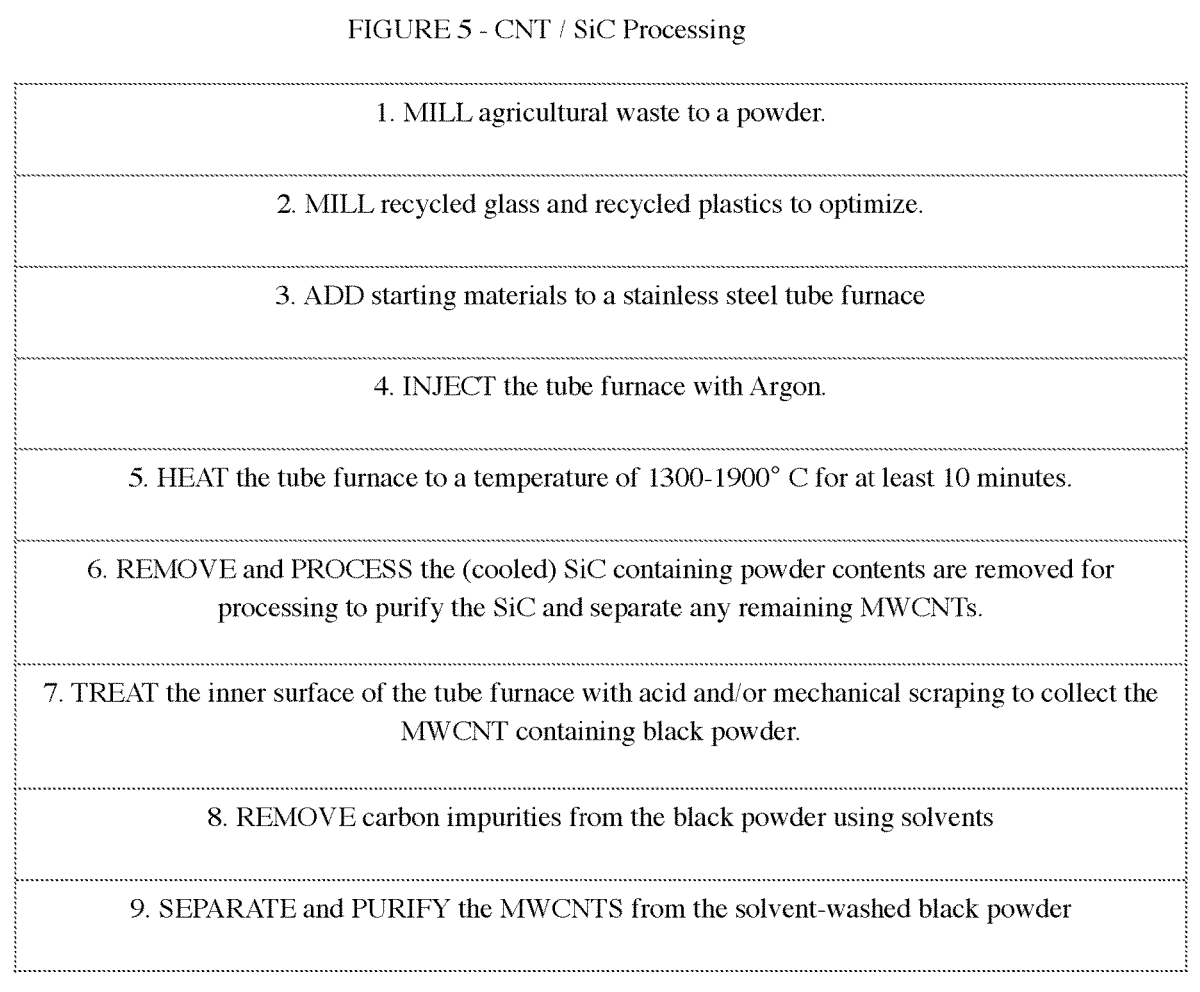

FIGURE 5 - CNT / SiC Processing

| |
|---|
| 1. MILL agricultural waste to a powder. |
| 2. MILL recycled glass and recycled plastics to optimize. |
| 3. ADD starting materials to a stainless steel tube furnace |
| 4. INJECT the tube furnace with Argon. |
| 5. HEAT the tube furnace to a temperature of 1300-1900° C for at least 10 minutes. |
| 6. REMOVE and PROCESS the (cooled) SiC containing powder contents are removed for processing to purify the SiC and separate any remaining MWCNTs. |
| 7. TREAT the inner surface of the tube furnace with acid and/or mechanical scraping to collect the MWCNT containing black powder. |
| 8. REMOVE carbon impurities from the black powder using solvents |
| 9. SEPARATE and PURIFY the MWCNTS from the solvent-washed black powder |

FIGURE 6

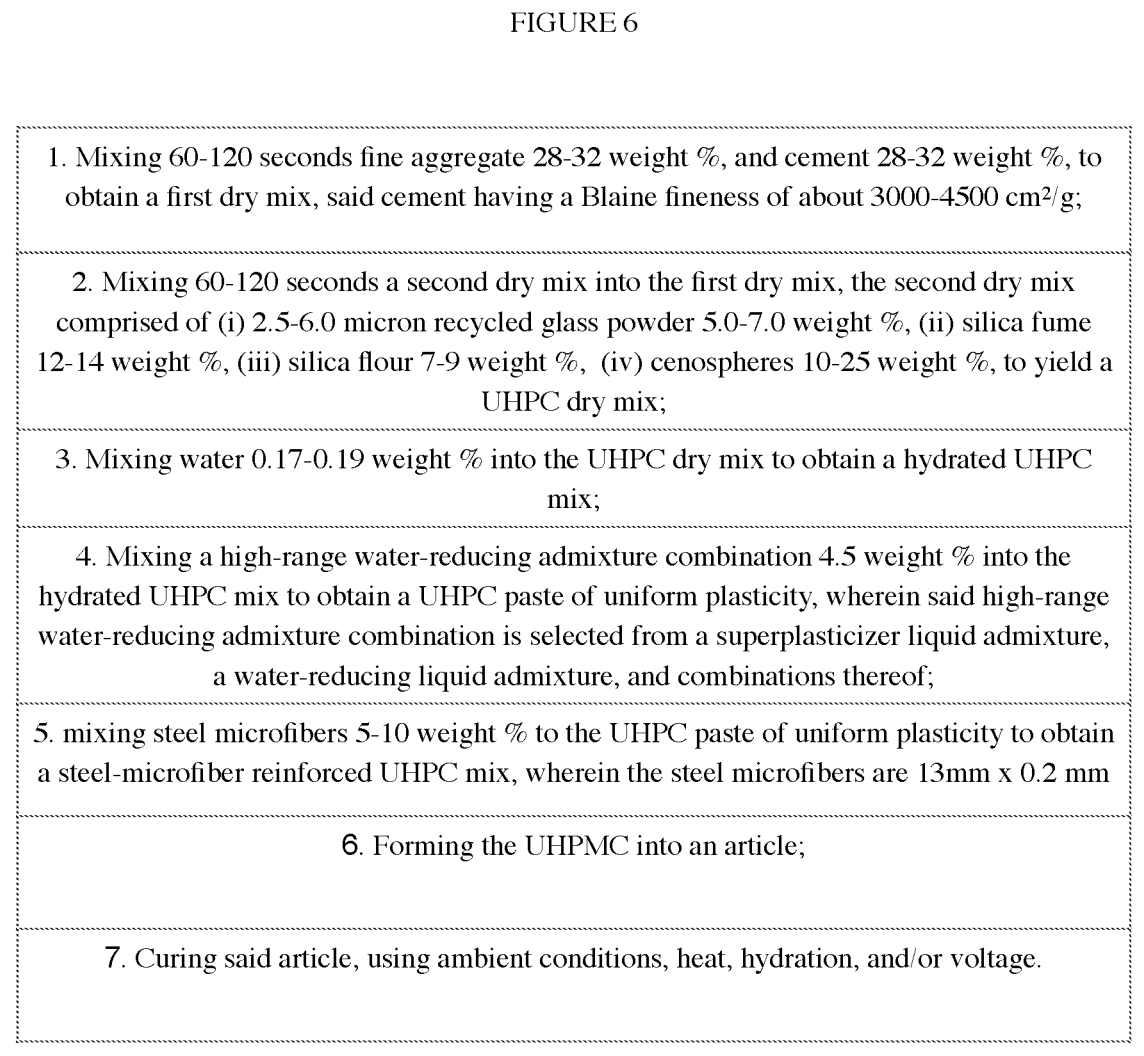

1. Mixing 60-120 seconds fine aggregate 28-32 weight %, and cement 28-32 weight %, to obtain a first dry mix, said cement having a Blaine fineness of about 3000-4500 cm²/g;

2. Mixing 60-120 seconds a second dry mix into the first dry mix, the second dry mix comprised of (i) 2.5-6.0 micron recycled glass powder 5.0-7.0 weight %, (ii) silica fume 12-14 weight %, (iii) silica flour 7-9 weight %, (iv) cenospheres 10-25 weight %, to yield a UHPC dry mix;

3. Mixing water 0.17-0.19 weight % into the UHPC dry mix to obtain a hydrated UHPC mix;

4. Mixing a high-range water-reducing admixture combination 4.5 weight % into the hydrated UHPC mix to obtain a UHPC paste of uniform plasticity, wherein said high-range water-reducing admixture combination is selected from a superplasticizer liquid admixture, a water-reducing liquid admixture, and combinations thereof;

5. mixing steel microfibers 5-10 weight % to the UHPC paste of uniform plasticity to obtain a steel-microfiber reinforced UHPC mix, wherein the steel microfibers are 13mm x 0.2 mm 6. Forming the UHPMC into an article;

7. Curing said article, using ambient conditions, heat, hydration, and/or voltage.

FIGURE 7

| 1. Mixing 60-120 seconds fine aggregate 28-32 weight %, and cement 28-32 weight %, to obtain a first dry mix, said cement having a Blaine fineness of about 3000-4500 cm²/g; |
| --- |
| 2. Mixing 60-120 seconds a second dry mix into the first dry mix, the second dry mix comprised of (i) 2.5-6.0 micron recycled glass powder 5.0-7.0 weight %, (ii) silica fume 12-14 weight %, (iii) silica flour 7-9 weight %, (iv) cenospheres 10-25 weight %, to yield a UHPC dry mix; |
| 3. Mixing water 0.17-0.19 weight % into the UHPC dry mix to obtain a hydrated UHPC mix; |
| 4. Mixing a high-range water-reducing admixture combination 4.5 weight % into the hydrated UHPC mix to obtain a UHPC paste of uniform plasticity, wherein said high-range water-reducing admixture combination is selected from a superplasticizer liquid admixture, a water-reducing liquid admixture, and combinations thereof; |
| 5. mixing steel microfibers 5-10 weight % to the UHPC paste of uniform plasticity to obtain a steel-microfiber reinforced UHPC mix, wherein the steel microfibers are 13mm x 0.2 mm |
| 6. Forming the UHPMC into an article; |
| 7. Curing said article, using ambient conditions, heat, hydration, and/or voltage. |
| 8. Configuring said cured UHPMC article with a voltage supply means to provide a heated UHPMC article. |

FIGURE 8

| Cor-Tuf UHPC Properties | | | | |
|---|---|---|---|---|
| | Test Method | Curing Conditions | Time Period | Result |
| Compressive Strength | ASTM C 1856 | Controlled Curing | at 28 days | 25,500 psi |
| Length Change of HHC | ASTM C157 | 73°F / 50% RH | at 28 days (26 days Dry) | -0.33% |
| Chloride Penetrability | ASTM C 1202 | 73°F Limewater | 28 days | ≤ 100 (Negligible) |
| | AASHTO T277 | 190°F water 5 days; 190°F air 2 days; 73°F water until testing | 28 days | ≤ 100 (Negligible) |
| Flexural Strength | ASTM C 1609 | 73°F/Limewater | 28 days | 3,148 psi |
| Direct Tensile Strength | AASHTO T397 | 73°F/Limewater | 28 days | 1,260 psi |
| Modulus of Elasticity | ASTM C 469 | 73°F/Limewater | 28 days | 6,800 ksi |
| Abrasion Resistance, Avg Loss | ASTM C 944 | 73°F/Limewater | 58 days | 0.016 oz |
| Freeze Thaw Resistance RDM | ASTM A 666 | 73°F/Limewater | 28 days | 600 cycles, 96% |

FIGURE 9

| MIX DESIGN | TIME | TEMP DEGREES | STATIC SPREAD | DYNAMIC SPREAD | BUCKET VOLUME | MEASURE WEIGHT | MEASURE WITH CONCRETE | UNIT WEIGHT |
|---|---|---|---|---|---|---|---|---|
| #1 NO FIBER | 1:00 | 89 | 6X6 | | 0.25 | 8.4 | 43.3 | 139.6 |
| #2 UH-FIBER | 1:50 | 92 | 5X5 | 6.5X6 | 0.25 | 8.4 | 41.42 | 132.08 |
| #3 DD FIBER | 2:26 | 82 | 8X8 | 9X9 | 0.25 | 8.4 | 44.75 | 145.4 |
| #4 3D MIX | 3:05 | 86 | 8.5X9 | | 0.25 | 8.4 | 45.15 | 147 |

| | 3 DAY | 7 DAY | 14 DAY | 21 DAY | 28 DAY |
|---|---|---|---|---|---|
| #2 | 8192 | 10250 | | | |
| #2 | 9780 | 13020 | | | |
| | | | | | |
| #3 | 12807 | 15847 | | | |
| #3 | 7813 | 14661 | | | |
| | | | | | |
| #4 | 7309 | 10450 | | | |
| #4 | 8901 | 9784 | | | |

| MIX DESIGN | TIME | TEMP DEGREES | STATIC SPREAD | DYNAMIC SPREAD | BUCKET VOLUME | MEASURE WEIGHT | MEASURE WITH CONCRETE | UNIT WEIGHT |
|---|---|---|---|---|---|---|---|---|
| DAY 1 | 9:25 | 81 | 8.5X8 | 9X9 | 0.25 | 8.4 | 44.62 | 144.88 |

| 5 DAY | 7 DAY | 14 DAY | 21 DAY | 28 DAY |
|---|---|---|---|---|
| 14500 | 15001 | | | |
| 12854 | 13952 | | | |

FIGURE 12

Constituents, Packaging and Yield:

1. Premix: proprietary pre-blended constituents, local masonry sand and portland cement per QC manual.
- 50 lb (23 kg) bags; 40 bags per pallet.
  1 pallet yields approx. 1.46 cubic yards
- 1078 lb (489 kg) super sack; 2 bags per pallet.
  1 pallet yields approx 2 cubic yards
- Complete pre-mix (with sand and cement) available upon request

2. Liquid Admixture: high range water reducer, corrosion inhibitor
- 1 gal (3.78 L) pails
- 5 gal (19 L) pails
- 264 gal (1,000 L) totes

3. Steel Fibers: 0.008in (0.20 mm) dia x 0.5 in (13 mm) long
   Tensile strength ≥295ksi (200MPa) (not included w/ pre-mix)

4. Water: to be provided by contractor in accordance with QC manual

FIGURE 13

FIGURE 14

| CTL Group Material Testing Results** | | | | |
|---|---|---|---|---|
| Concrete Performance | Test Method | Curing Conditions at CTL Group | Age | Test Result |
| Compressive Strength | ASTM C 39 | 73°F/100% RH | at 1 day | 9,050 psi |
| Compressive Strength | ASTM C 39 | 73°F/100% RH | at 3 days | 11,140 psi |
| Compressive Strength | ASTM C 39 | 73°F/100% RH | at 14 days | 20,780 psi |
| Compressive Strength | ASTM C 39 | 73°F/100% RH | at 28 days | 22,920 psi |
| Compressive Strength | ASTM C 39 | 73°F/100% RH | at 56 days | 24,770 psi |
| Compressive Strength | ASTM C 1856 | Controlled Curing | at 28 days | 25,500 psi |
| Length Change | ASTM C 157 | 73°F/50% RH | 28 days (26 days Dry) | -0.033% |
| Chloride Penetrability | ASTM C 1202 AASHTO T277 | 73°F Limewater  130°F water 5 days; 190°F air 2 | 28 days  28 days | ≤100 (Negligible)  ≤100 (Negligible) |
| Flexural Toughness | ASTM C 1609 | 73°F/Limewater | 28 days | 3148 psi |
| Direct Tensile Strength | * See Notes | 73°F/Limewater | 28 days | 1653 psi |
| Modulus of Elasticity | ASTM C 469 | 73°F/Limewater | 28 days | 6750 ksi |
| Abrasion Resistance, Ave Loss | ASTM C 944 | 73°F/Limewater | 58 days | 0.016 oz |
| Freeze Thaw Resistance RDM | ASTM A 666 | 73°F/Limewater | 28 days | 600 cycles, 96% |

COMPOSITIONS OF STEEL-MICROFIBER REINFORCED ULTRA HIGH PERFORMANCE CONCRETE (UHPC) USING RECYCLED GLASS POWDER AND PROCESSES FOR MAKING THE SAME

BACKGROUND OF THE INVENTION

Field of the Invention

The invention relates to compositions and processes for making improved ultra high performance concrete with steel-microfiber and recycled glass powder, and articles made from the same.

Description of the Related Art

Durable construction materials come in many forms. However, there is still a need for improved compositions having properties desirable in construction projects. The use of waste glass powder as a partial substitute for portland cement in concrete provides a pozzolanic (cementing) function.

U.S. Pat. No. 7,775,466 to Grasso for "Production of glass powder from waste glass" discusses a clean dry glass powder useful as a substitute for Portland cement in concrete, in paints, and for other known uses for glass powder produced conventionally can be produced from unsorted post-consumer waste glass, including a substantial fraction of non-glass items, by employing glass pulverizing equipment to reduce waste glass to small fragments, allowing removal of trash, employing a multistep washing process to clean the glass fragments, in the preferred embodiment using aggregate cleaning equipment, drying the fragments, preferably using fluidized bed techniques, and grinding the glass to a desired particle size, preferably using a ball mill, in combination with an air classification step to produce a glass powder of uniform particle size.

U.S. Pat. No. 6,296,699 to Jin for "Inorganic binders employing waste glass" discusses using waste glass powder in concrete and "artificial stone". An alkali metal activator, for example, an alkali metal hydroxide, silicate, aluminate, carbonate, sulfate, phosphate or fluoride is mixed with the glass powder and water, and this material cured, in some examples at room temperature. Jin teaches that the waste glass should be cleaned in advance to remove residues such as sugar from the waste glass which can affect the setting and binding of the concrete. He further states that the processes used to create glass powder from waste glass, e.g., ball milling and pulverizing, are well known.

In a report titled "Recycling of Crushed Glass into Coating Products", CWC Report No. GL-96-1 (1998) the authors state that "paint and coating applications are especially sensitive to organic contamination. For example, one unwashed jar of mayonnaise could provide enough residue to bacterially contaminate many gallons of paint."

Vitunac et al U.S. Pat. Nos. 5,350,121 and 5,246,174 show methods for recycling glass, directed primarily to recycling of TV picture tubes, with much attention to removing heavy metals, coatings and the like. Pulverizing, washing, rinsing and further crushing steps are disclosed generally.

Abernathy U.S. Pat. No. 4,030,670 shows a trash recycling system including separation of various sorts of trash. Glass fragments are washed and dried.

Morey et al U.S. Pat. No. 4,067,502 and Morey U.S. Pat. No. 4,070,273 show flotation separation of glass fragments (up to 10 mesh) using amines as beneficiation agents.

Baxter U.S. Pat. No. 5,803,960 shows making glass for concrete reinforcement, while avoiding the alkali-silica reaction (ASR) by mixing a lithium-containing composition with crushed bottle glass. The glass may be provided in powder or fibrous form. Baxter et al U.S. Pat. No. 5,810,921 shows a similar invention using chromium instead of lithium.

Pelot et al U.S. Pat. Nos. 6,344,081 and 6,699,321 show concrete compositions, and emphasize the use of "electric" or "E-glass" powder of between 100 and 325 mesh in concrete. The claims require the glass particles to be no larger than 80-120 mesh, 40-60% between 180 and 220 mesh, and 10-30% less than 325 mesh; the cement used is to be low-alkali. The glass is to comprise up to 25% of the mix.

Bergart U.S. Pat. Nos. 5,950,936 and 6,168,102 show a system for recycling glass from a post-consumer waste glass stream including other sorts of debris. The process steps include various sorting, screening, crushing, presoaking, washing, dewatering, and drying steps. If a glass powder is desired, second crushing and separation steps may be included. The dewatering step can be performed using a rotary screw conveyor (col. 4, line 32 of the '936 patent), and the drying step using a fluidized bed dryer (col. 4, line 44). It is acknowledged that some ceramic content will remain, and it is asserted that if the ceramic content is not acceptable to the end user, a second crushing stage can be performed to form a fine glass powder; the "ceramic particles dispersed throughout the glass powder will dissipate in further processing". Col. 5, lines 48-52.

Kimmel et al U.S. Pat. No. 6,112,903 shows a method for sorting various types of glass from one another. A stream of glass cullet mixed with other items is heated using microwave energy; as different types of glass and items of other materials absorb different amounts of energy, they are differentially heated, and can be differentiated in a digital image made by a thermal imaging camera. A downstream diverter mechanism can then be used to separate out various constituents of the stream. Kimmel et al U.S. Pat. No. 6,464,082 shows a complete system employing this technique.

Harada U.S. Pat. Nos. 6,250,576 and 6,446,884 show a method and system for producing glass sands by crushing and agitating steps.

Sunde U.S. Pat. No. 6,743,287 shows a concrete using relatively large glass particles, requiring addition of a "non-alkali reactive mineral", e.g. granite.

Whaley U.S. Pat. No. 6,770,328 shows a method of making a terrazzo surface using recycled glass in an epoxy matrix. Preparation of the glass is not discussed.

Thus, although the prior art discusses the use of waste glass powder in various applications, in particular as a partial substitute for portland cement in concrete, there is still a need to improve the manufacturing process for ultra high performance concrete, known for having psi strength of 21,000 psi or more.

SUMMARY OF THE INVENTION

Accordingly, the invention provides compositions and processes for making such compositions that are useful in manufacturing steel-microfiber reinforced ultra high performance concrete by mixing sand, portland cement having of Blaine fineness of about 280 to about 360 m2/kg, and a dry mixture of constituents consisting of 2.5-6.0 micron recycled glass powder, silica fume, silica flour, cenospheres, and optionally microinclusions consisting of carbon nanotubes, ultra-high molecular weight polyethylene fibers, multi-walled carbon nanotubes, and silicon carbide, to yield a homogenous UHPC dry mix, then first mixing water into the homogenous UHPC dry mix, followed by mixing a superplasticizer admix and a water-reducing admix to form a UHPC cement-containing paste of uniform plasticity, and finally mixing steel microfibers to the UHPC cement-containing paste of uniform plasticity to obtain a steel-microfiber reinforced UHPC cement mix.

The steel-microfiber reinforced UHPC cement mix is used to manufacture components selected from the group consisting of: overlays, joint fills, beam end-caps, plates, channels, pipes, tubes, I-sections, H-beams, WF-sections, connectors, panels, vehicle up-armoring, ballistic armor, blast-resistant panels, man-portable panels, thin armor panels, forced entry resistant structural elements, roofing tiles, wall panels, floor tiles, counter-tops, hurricane and tornado resistant structural elements, bollards, planters, sea-wall components, drainage tiles, pipes and ditch components, sidewalks, curbs, driveways, aprons, bricks, pavers, concrete blocks, tank pads, anchor blocks, and combinations thereof.

The compositions may also be cured to achieve enhanced strength by (i) placing in an environment of approximately 100% relative humidity for about seven days at ambient temperature, (ii) submersing in water of approximately 85° C. to about 91° C. for about three to about five days, and (iii) heating in air at approximately 85° C. to about 91° C. for about one to about two days, wherein, said cured composition component becomes crystalline unlike said composition components cured under ambient conditions as an amorphous calcium silicate hydrate.

In another preferred embodiment of the invention, there is provided a component, comprising: a form made using the composition(s) described herein, wherein the component has a strength of at least 18,000-25,000 psi, or has a strength of over 21,000 psi, or is heat and/or moisture cured and has a strength of over 21,500 psi, or is voltage cured and has a strength over 21,500 psi.

BRIEF DESCRIPTION OF THE FIGURES

FIG. 1 shows a process flowchart illustrating one preferred process of this present invention. FIG. 1 shows the required sequential process of mixing first dry constituents of fine aggregate (sand) and cement to yield a first homogenous dry mix, followed by mixing with second dry constituents of 2.5-6.0 micron recycled glass powder, silica fume, and silica flour, to obtain a homogenous UHPC dry mix (UHPC dry mix), followed by adding water only, with further mixing, then adding a superplasticizer admix and a water-reducing admix to obtain a UHPC cement-containing paste of uniform plasticity, and finally mixing steel microfibers to the UHPC cement-containing paste of uniform plasticity to obtain a steel-microfiber reinforced UHPC cement mix.

FIG. 2 is a process flowchart of another preferred process, using recycled glass. FIG. 2 shows milling the recycled glass to a powder.

FIG. 3 is a process flowchart illustrating the use of secondary microinclusions (SiC, microfibers, and CNTs) in ultra high performance concrete. FIG. 2 shows mixing a UHPC dry mix with fibers containing SiC and/or MWCNTs to obtain reinforced ultra high performance concrete. Surprisingly, it has been found that it is important for the microinclusions to be dry-mixed with the first constituents to ensure the proper dispersion of the microinclusions within the resultant composition and to obtain homogeneity of the mixed components, water to be added last to avoid over-hydrating the mix.

FIG. 4 is a process flowchart of another preferred process, shows milling the agricultural waste to a powder, with any added silica and/or organic components. Heating the starting materials. And purifying the SiC and the MWCNTs.

FIG. 5 is a process flowchart illustrating the process of converting agricultural waste to carbon nanotubes and silicon carbide.

FIG. 6 is a process flowchart illustrating the process of forming an ultra high performance concrete article.

FIG. 7 is a process flowchart illustrating the process of forming a heat-producing a ultra high performance concrete article by applying a voltage supply to generate voltage heating in the embedded CNTs/steel fibers.

FIG. 8 is a table showing CorTuf steel microfiber reinforced UH PC properties.

FIG. 9 is a table showing psi strength after 3-day and 7-day curing periods for a mix designs compared to no fiber mixes, "UH-FIBER", "DD FIBER", and "3D mix".

FIG. 12 is a table of steel microfiber reinforced UHPC constituents, packaging, and yield.

FIG. 13 is an image of a precast form (wall) made from a unitary pour of steel microfiber reinforced UHPC.

FIG. 14 is a table of steel microfiber reinforced UHPC testing results.

FIG. 15 shows a mobile trailer having hopper bins connected by feeders/augers for sand, cement, UHPC additive, and microfibers, as well as containers for dispensing admix and water.

DETAILED DESCRIPTION

Figures 10, 11:
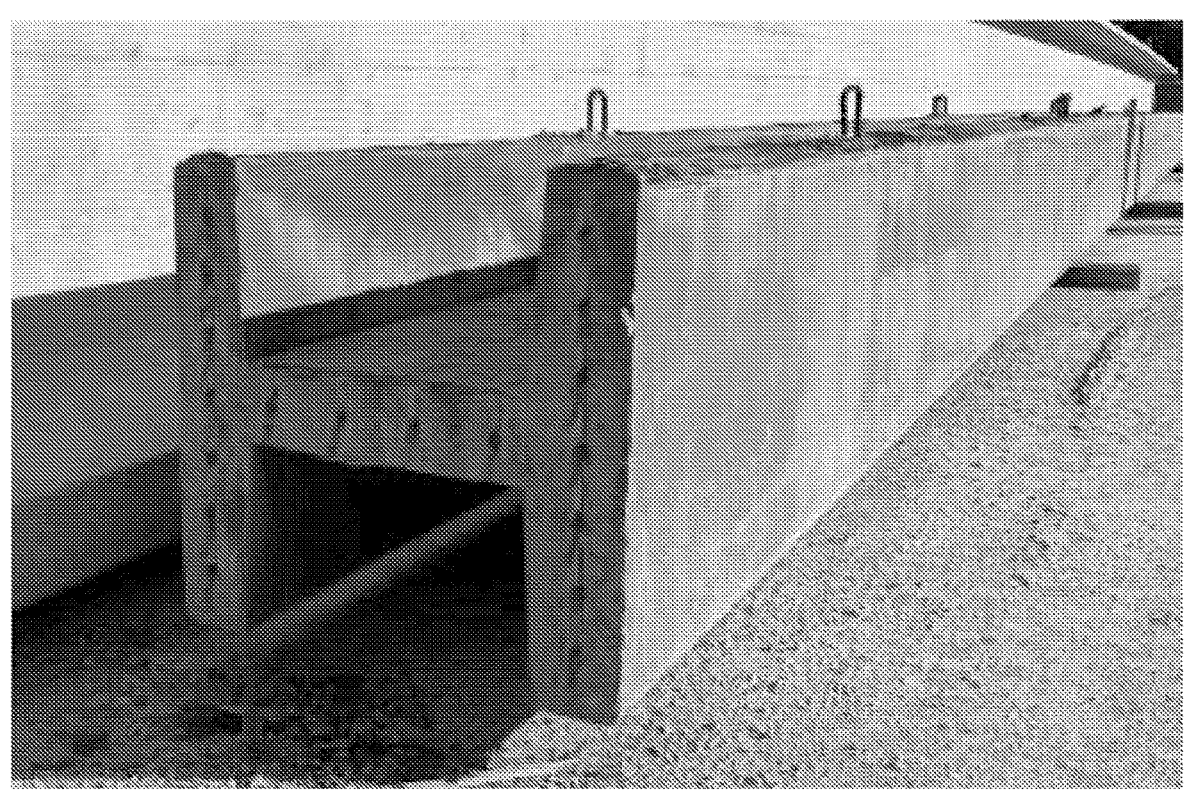
FIG. 10 is a table showing psi strength after 5-day and 7-day curing periods for a mix design "Day 1".
FIG. 11 is an image of an H pile constructed using the steel microfiber reinforced UHPC herein.
Figure 15:
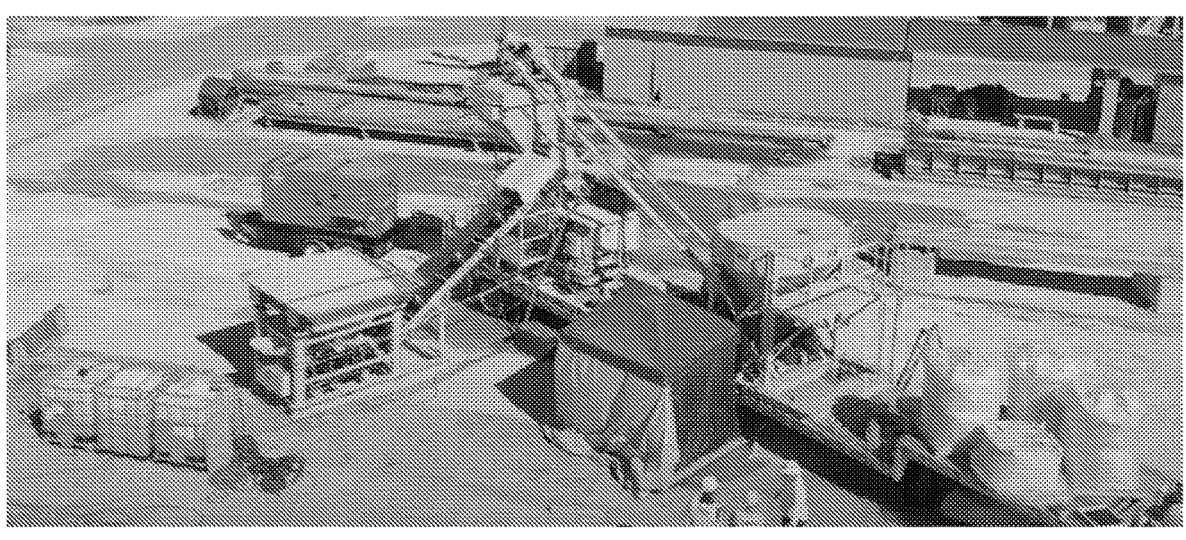
FIG. 15 is an image of a processing plant.

Disclosed herein are embodiments directed to compositions and processes for making such compositions that are useful in manufacturing ultra high performance concrete by a sequential process of mixing first dry constituents of fine aggregate (sand) and cement to yield a first homogenous dry mix, followed by mixing with second dry constituents of 2.5-6.0 micron recycled glass powder, silica fume, silica flour, and cenospheres to obtain a homogenous UHPC dry mix (UHPC dry mix), followed by adding water only, with further mixing, then adding a superplasticizer admix and a water-reducing admix to obtain a UHPC cement-containing paste of uniform plasticity, and finally mixing steel microfibers to the UHPC cement-containing paste of uniform plasticity to obtain a steel-microfiber reinforced UHPC cement mix.

In one of the preferred embodiments of the invention, the process comprises (1) mixing fine aggregate 28-32 weight %, and portland cement 28-32 weight %, to obtain a first homogenous dry mix, said fine aggregate comprised of sand and said portland cement having a Blaine fineness of about 3000-4500 cm2/g; (2) mixing a second dry mix into the first homogenous dry mix, the second dry mix comprised of (i) silica fume 12-14 weight %, (ii) silica flour 7.0-9.0 weight %, (iii) cenospheres 10-25 weight %, and (iv) 2.5-6.0 micron recycled glass powder 5.0-7.0 weight %; and optionally (iv) microfibers/microinclusions selected from one or more of the group consisting of a second component of recycled glass powder 20-200 micron, carbon nanotubes, multi-walled carbon nanotubes, silicon carbide, and ultra-high molecular weight polyethylene fibers, to obtain a second homogenous dry mix (UHPC dry mix); (3) mixing water 0.17-0.19 weight % into the UHPC dry mix; and then sequentially (4) mixing a high-range water-reducing admixture combination at 4.5 weight % consisting of a superplasticizer liquid admixture and a water-reducing liquid admixture, to obtain a UHPC cement-containing paste of uniform plasticity, and finally (5) mixing steel microfibers averaging 13 mm in length and 0.2 mm in diameter at 5-10 weight % to the UHPC cement-containing paste of uniform plasticity to obtain a steel-microfiber reinforced UHPC cement mix.

Also disclosed herein are embodiments directed to UHPC dry mix and processes for making UHPC dry mix comprising: (i) mixing 2.5-6.0 micron recycled glass powder into a combined dry mixture of first constituents consisting of fine aggregate 28-32 weight %, steel fibers 5-7 weight %, portland cement 28-32 weight %, silica fume 12-14 weight %, silica flour 7.0-9.0 weight %, and cenospheres 10-25 weight %, all percentages adding to 100, to obtain a homogenous UHPC dry mix, said fine aggregate comprised of sand, said steel fibers are 10-20 mm in length and 0.10-0.20 mm in diameter, and said portland cement having a Blaine fineness of about 3000-4500 cm2/g, and optionally (ii) mixing microinclusions into the homogenous UHPC dry mix, the microinclusions selected from one or more of the group consisting of carbon nanotubes, multi-walled carbon nanotubes, silicon carbide, and ultra-high molecular weight polyethylene fibers.

Any of the embodiments herein may include additional microinclusions that are powder, grit, turnings, dust, flour, ribbon, shavings, nano- and micro-spheres, fibers, wire, microparticles, nanoparticles, complexes, aggregates, and mixtures thereof, of materials selected from the group consisting of: metals, alloys, steel, synthetics, polymers, natural inorganics, minerals, glass, asbestos, carbon, cellulose, synthetic organics, natural organics, sisal, and combinations thereof.

Any of the embodiments herein may include recycled glass powder having an average size (D50) of 4 microns. Other embodiments may include a range wherein recycled glass powder has an average size (D50) of 2.5-6.0 microns.

Any of the embodiments may include a second component of recycled glass powder having an average size (D50) of 5-50 microns. Other second component embodiments may include a range wherein a second component of recycled glass powder has an average size (D50) of about 20-200 microns.

Any of the embodiments herein may include a composition as described and claimed wherein said cement is portland cement with a calcium to silica ratio of less than about 3.1.

Any of the embodiments herein may include wherein said microinclusions include fibers having lengths between about 18 to about 38 mm and in diameters between about 0.38 to about 0.63 mm.

Any of the embodiments herein may include wherein fibers or wires incorporate ends selected from the group consisting of: hooked ends, approximately straight ends, bulbed ends, and combinations thereof.

Any of the embodiments herein may include fibers or wires having a surface selected from the group consisting of: silica bonded to said surface, glass frit bonded to said surface, a roughened surface, and combinations thereof.

Any of the embodiments herein may include a composition as described and claimed further comprising mats of steel strands of diameter less than about 2.5 mm affixed to a tensile-load carrying face of said structure.

Any of the embodiments herein may include wherein said high-range water-reducing admixture comprises polycarboxylates, wherein said amount is in the range of about three to about 20 fluid ounces per 100 lb of said resultant cement-containing paste.

Any of the embodiments herein may include wherein said microinclusions are selected from the group consisting of: fiber microinclusions, spherical microinclusions, polyhedron microinclusions, and combinations thereof.

Any of the embodiments herein may include wherein said microinclusions have a longest dimension from about one micron to about 150 microns.

Any of the embodiments herein may include wherein microinclusions are fabricated from the group consisting of: metals, ceramics, organics, natural inorganics, natural minerals, synthetics, and combinations thereof.

Any of the embodiments herein may include configurations of said microinclusion materials are selected from the group consisting of: steel shavings, ceramic whiskers, ceramic spheres, mineral fibers, wollastonite, carbon fibers and combinations thereof.

Any of the embodiments herein may include wherein said cement-containing paste is a stiff dough with approximately zero slump.

Any of the embodiments herein may include wherein said cement-containing paste is a flowable mixture.

Any of the embodiments herein may include wherein said cement-containing paste is used to manufacture components are selected from the group consisting of: overlays, joint fills, beam end-caps, plates, channels, pipes, tubes, I-beam sections, H-beam components, WF-sections, smooth columns, fluted columns, connectors, panels, vehicle up-armoring, ballistic armor, blast-resistant panels, man-portable panels, thin armor panels, forced entry resistant structural elements, wall panels, roofing tiles, floor tiles, kitchen and bath countertops, laboratory bench tops, hurricane and tornado resistant structural walls, panels, and supports, bollards, planters, sea-wall components, drainage tiles, pipes and ditch components, underflooring, wall tiles, stepping stones, planters, pavers, trusses, joists, rafters, support gussets, decking, footers, mounting pads, post and pole anchor blocks, precast water conduit, precast sewage pipes, precast pipe connectors, concrete blocks, bricks, refractory bricks, fireplace liners, veneers, oil and gas well cementing for casings, seawalls, sea barrier blocks and forms, undersea pilings, undersea mounting pads, harbor docks, precast highway slabs, precast railroad ties, precast parking blocks, precast jersey barriers, street curbs, sidewalks, driveways, drive aprons, warehouse flooring slabs, storage tank pads, power station towers, and power station dams.

Any of the embodiments herein may include wherein said components are employed to fabricate items selected from the group consisting of: vehicle up-armoring, ballistic armor, blast-resistant panels, man-portable panels, thin armor panels, forced entry resistant structural walls, panels, and supports, armored roofing tiles, ballistic wall panels, ballistic floor tiles, hurricane and tornado resistant structural elements, and combinations thereof.

In another preferred embodiment, the invention provides a method of producing a component of a structure, comprising: (i) Preparing a uniform cement-containing paste according to the processes herein; and (ii) Forming said resultant cement-containing paste in the shape of said component, and curing by heating and/or hydrating and/or applying voltage to said formed resultant cement-containing paste.

In another preferred embodiment, the invention provides a method as described and claimed wherein said forming is done by techniques selected from the group consisting of: spin casting, extrusion molding, pressure molding, pouring into forms, and combinations thereof.

In another preferred embodiment, the invention provides a method as described and claimed wherein said composition component is cured by: (i) placing in an environment of approximately 100% relative humidity for about seven days at ambient temperature, (ii) submersing in water of approximately 85° C. to about 91° C. for about three to about five days, and (iii) heating in air at approximately 85° C. to about 91° C. for about one to about two days, wherein, said cured composition component becomes crystalline. This crystalline structure is unlike components cured under ambient conditions which create weaker amorphous calcium silicate hydrate components having lower strength of 3500 psi or lower.

In another preferred embodiment of the invention, there is provided a component, comprising: a form made using the composition(s) described herein, wherein the component has a strength of at least 10,000 psi.

In another preferred embodiment, the component has a strength of over 21,500 psi.

In another preferred embodiment, the component is heat cured, voltage cured, or both, and has a strength from 21,500-50,000 psi.

Terminology

The terminology used herein is for the purpose of describing particular embodiments only and is not intended to limit the full scope of the claims. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a", "an" and "the" are intended to include the plural forms as well, unless the context clearly indicates otherwise. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," etc.). Similarly, the terms "comprises" and/or "comprising," when used in this specification, specify the presence of stated features, integers (or fractions thereof), steps, operations, elements, and/or components, but do not preclude the presence or addition of one or more other features, integers (or fractions thereof), steps, operations, elements, components, and/or groups thereof. As used in this document, the term "comprising" means "including, but not limited to."

As used herein the term "and/or" includes any and all combinations of one or more of the associated listed items. It should be understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All ranges disclosed herein also encompass any and all possible subranges and combinations of subranges thereof unless expressly stated otherwise. Any listed range should be recognized as sufficiently describing and enabling the same range being broken down into at least equal subparts unless expressly stated otherwise. As will be understood by one skilled in the art, a range includes each individual member.

The embodiments herein, and/or the various features or advantageous details thereof, are explained more fully with reference to the non-limiting embodiments that are illustrated in the accompanying drawings and detailed in the following description. Descriptions of well-known components and processing techniques are omitted so as to not unnecessarily obscure the embodiments herein. Like numbers refer to like elements throughout.

The examples and/or embodiments described herein are intended merely to facilitate an understanding of structures, functions, and/or aspects of the embodiments, ways in which the embodiments may be practiced, and/or to further enable those skilled in the art to practice the embodiments herein. Similarly, methods and/or ways of using the embodiments described herein are provided by way of example only and not limitation. Specific uses described herein are not provided to the exclusion of other uses unless the context expressly states otherwise.

DEFINITIONS

The term "ultra high performance concrete" refers to compositions made by the processes described here, and may further include the addition of aggregate to the cement paste.

The term "sand" refers to particles with a diameter of between 0.074 and 4.75 millimeters.

ISO 14688 grades sands as fine, medium, and coarse with ranges 0.063 mm to 0.2 mm. The most common constituent of sand, in inland continental settings and non-tropical coastal settings, is silica (silicon dioxide, or $SiO_2$), usually in the form of quartz.

The term "portland cement" refers to, in ASTM C150, hydraulic cement, cement that hardens by reacting with water and also forms a water-resistant product, produced by pulverizing clinkers which consist essentially of hydraulic calcium silicates, usually containing one or more of the forms of calcium sulfate as an inter ground addition. The term portland cement also refers to, in European Standard EN 197-1, a hydraulic material which shall consist of at least two-thirds by mass of calcium silicates, (3 $CaO \cdot SiO_2$, and 2 $CaO \cdot SiO_2$), the remainder consisting of aluminium- and iron-containing clinker phases and other compounds. The ratio of CaO to $SiO_2$ shall not be less than 2.0. The magnesium oxide content (MgO) shall not exceed 5.0% by mass.

The term "silica fume", also known as microsilica, (CAS number 69012-64-2, EINECS number 273-761-1) refers to an amorphous (non-crystalline) polymorph of silicon dioxide, silica. It is an ultrafine powder collected as a by-product of the silicon and ferrosilicon alloy production and consists of spherical particles with an average particle diameter of 150 nm.

The term "silica flour" refers to a very finely divided, highly purified form (>98.0% silica) of crystalline silica that consists of particles of 10-100 μm in diameter.

The term "cenospheres" refers to a lightweight, inert, hollow sphere made largely of silica and alumina and filled with air or inert gas, typically produced as a coal combustion byproduct at thermal power plants. The color of cenospheres varies from gray to almost white and their density is about 0.4-0.8 g/cm3.

The term "steel microfibers" refers to hair-like steel fibers that are on average 13 mm long and 0.2 mm in diameter. As used herein, the steel microfibers, in some embodiments contemplated within the scope of the invention, may include, without limitation, fibers ranging from 10-40 mm in length and 0.2-0.5 mm in diameter.

The term "admixture" or "admix" refers to chemicals and/or minerals that are used to improve the behavior of ultra high performance concrete under a variety of conditions. Chemical admixtures are used to improve the quality of ultra high performance concrete during mixing, transporting, placement and curing. Chemical admixtures can be categorized as follows: air entrainers; water reducers; set retarders; set accelerators; superplasticizers; and specialty admixtures, which include corrosion inhibitors, shrinkage control, alkali-silica reactivity inhibitors, and coloring. ASTM C494 specifies the requirements for seven chemical admixture types. They are: Type A: Water-reducing admixtures, Type B: Retarding admixtures, Type C: Accelerating admixtures, Type D: Water-reducing and retarding admixtures, Type E: Water-reducing and accelerating admixtures, Type F: Water-reducing, high range admixtures, Type G: Water-reducing, high range, and retarding admixtures The term "water reducer" refers to a superplasticizer admixture that is used to: (1) increase slump, (2) lower the water-cement ratio, or (3) reduce cement content. Water reducers range in ability to reduce water from low (achieve a minimum 5% water reduction) to mid-range (reduce water content by at least 8% and as much as 15%) to high-range (reduce water content from 12% to as much as 40%). Hydrated cement paste shrinks as it loses moisture from its extremely small pores. As the moisture is lost in these small pores, the surface tension of the remaining water tends to pull the pores together which results in a loss of volume over time. Shrinkage reducing admixtures (SRAs) are designed to decrease the effects of drying shrinkage by reducing the surface tension in these pores. Curing also affects cracking. In slabs, the top tends to dry out first and shrinks while the lower sections still have a higher moisture content. This difference in moisture can be altered by use of Shrinkage Reducing Admixtures, which alter the way water migrates through the ultra high performance concrete and results in a more uniform moisture profile.

The term "set accelerators" refers to compositions that work by accelerating cement hydration, which results in shortened setting times and increased early age strengths, particularly in cooler temperatures. They increase the rate of early strength development and reduce time required for curing and protection.

The term "superplasticizers" aka (High-Range Water Reducers) refers to compositions that can make a low-to-normal slump concrete into a high-slump flowing concrete which can be placed with little or no vibration. High-range water reducers fall into either ASTM C494 Type F or Type G classification. In either case, they can be used to produce very high slumps without segregation, an ideal situation where increased flowability is necessary due to congested reinforcement. Other applications and benefits of high-range water reducers include: difficult wall placements, narrow forms, sections with blockouts, penetrations, or embedded items, pumping high vertical distances, fast placement of concrete, and increased lift heights and free fall distances. The increased thinness of the ultra high performance concrete mix means that forms should be tight to prevent leakage even through small joints which can result in fins and discoloration. Type F superplasticizers: Added at the job site and keep ultra high performance concrete flowable for a short period of time. At some point, the concrete will lose slump quickly. Type G superplasticizers: Can be added either during batching or at the job site. This admixture will delay setting, but cause the ultra high performance concrete to be flowable for a longer period of time which could delay finishing. If haul times are particularly long, Type G can be added at the plant. However, if delivery is delayed too long, the effects can be diminished. Redosing is possible to regain the plasticity of the mix.

The term "water reducers" refers to compounds comprising a polyoxyalkyl chain and an amino-alkylene phosphonic group. Any of the processes and compositions herein may include an admixture comprising polycarboxylate, glutaral with 2-octyl-2H-isothiazol-3-one, 1,2-benzisothiazol-3 (2H)-one with methylisothiazolinon, 2,2-iminodietanol with dodecyldimethylamine and formaldehyde, formaldehyde, 1,2-benzisothiazol-3(2H)-one, 5-chloro-2-methyl-2H-iso-thiazol-3-one with 2-methyl-2H-isothiazol-3-one, methyl-isothiazolinon, decyldimethylamine, and mixtures thereof.

The term "mixing" refers to a process of combining dry ingredients to provide a heterogenous distribution of differing materials. Mixing may involve solid-solid mixing or mixing bulk solids with small amounts of liquid. Mixing includes a process of combining materials through tumbling, beating or stirring contents within a vessel, batch or continuous process, and storage silo mixing using live bins. Batch mixing may use drum mixers or pan mixers.

The present invention performs mixing for approximately 5-10 minutes and does not require high speed mixers to prepare the steel-fiber reinforced UHPC cement mix.

The term "curing" refers to the process of applying heat and/or hydration and/or voltage, either humidity or submersion in water, to harden a poured (in situ) or formed (pre-cast) ultra high performance concrete article. The curing process increases the strength of the ultra high performance concrete. For example, curing can increase a ultra high performance concrete article from 3,000 psi to over 21,500 psi. Heating can be applied using standard thermal means and can also be applied using voltage heating where CNTs are intermixed with ultra high performance concrete.

The term "psi" refers to pounds per square inch, and is synonymous with megapascal, abbreviated MPa. The conversion units between MPa and psi is that 1 MPa=145.0377 psi, and 1000 psi=6.894757 MPa.

The term "voltage heating" refers to the process of applying a voltage, e.g. 40V, to an article of ultra high performance concrete having CNT and/or steel microfibers. The voltage can be applied using wire connectors that are directly connected to the CNTs and/or steel microfibers. Such voltage heating can be used in curing the ultra high performance concrete, but can also be used on a finished product to generate a heated ultra high performance concrete component, such as a heated floor tile, a heated wall panel, a heated roofing tile, a heated sidewalk, a heated bridge deck, etc. without intending to be limited.

The term "hydraulic binder" means, according to the present invention, a powdery material which, mixed with water, forms a paste which sets and hardens as a result of reactions and hydration processes, and which after curing, retains its strength and stability even under water.

The term "hydraulic composition" means any composition comprising a hydraulic binder. This is, for example, a ultra high performance concrete.

The term "concrete" means a mixture of hydraulic binder, aggregates, water, possibly additives, and possibly mineral additions such as high performance concrete, very high performance concrete, self-compacting ultra high performance concrete, self-leveling ultra high performance concrete, self-compacting ultra high performance concrete, fiber ultra high performance concrete, ready-mix ultra high performance concrete or colored ultra high performance concrete. The term "ultra high performance concrete" also means concrete having undergone a finishing operation such as bush-hammered ultra high performance concrete, deactivated or washed ultra high performance concrete, or polished ultra high performance concrete. According to this definition, prestressed ultra high performance concrete is also meant. The term "ultra high performance concrete" includes mortars, in this case the ultra high performance concrete comprises a mixture of hydraulic binder, sand, water and possibly additives and possibly mineral additions. The term "ultra high performance concrete" according to the invention denotes indistinctly fresh ultra high performance concrete or hardened ultra high performance concrete.

According to the invention the term "aggregates" refers to gravel, chippings and/or sand.

The present invention can achieve the desired steel-fiber reinforced UHPC mix using any local sand, and does not require the user to specify a particular type or composition of sand.

The term "mineral additions" refers to a finely divided mineral material used in concrete to improve certain properties or to confer particular properties. These are, for example, fly ash (as defined in EN 450), silicas (as defined in the standard prEN 13263: 1998 or NF P 18-502), slags (such as defined in standard NF P 18-506), calcareous additions (as defined in standard NF P 18-508) and siliceous additions (as defined in standard NF P 18-509).

The term "setting" means according to the present invention the transition to the solid state by chemical reaction of hydration of the binder. The setting is usually followed by the hardening period.

The term "hardening" means according to the present invention the acquisition of the mechanical properties of a hydraulic binder, after the end of setting.

The term "water reducer" means an additive that serves to reduce the amount of water required to produce a ultra high performance concrete of at least 5%. By way of example, water reducing agents based on lignosulfonic acids, carboxylic acid or treated carbohydrates can reduce the water requirements for the production of a ultra high performance concrete by approximately 10% to 15%.

The expression "superplasticizer" or "superfluidifier" or "super water reducer" means a water reducer that reduces by more than 12%, the amount of water required for the realization of a ultra high performance concrete. Superplasticizers have generally been classified into four groups: sulfonated naphthalene formaldehyde condensate (or SNF, acronym for sulphonated naphthalene formaldehyde); sulphonated formaldehyde melamine condensate (or SMF, acronym for sulphonated melamine formaldehyde); modified lignosulphonates (or MLS, modified lignosulfonates); and others. More recent superplasticizers include polycarboxylate ("PC") polymer dispersant compounds. Some of the PC superplasticizers may have a comb structure comprising at least one main chain and pendant grafts. Such superplasticizers are designated by the acronym PCP. For example, these superplasticizers carry ionic functions of carboxylic and/or sulphonic and/or phosphonic, preferably carboxylic, type at the level of the main chain and pendant links of the polyethylene glycol, polypropylene glycol, copolymer or other preferably water-soluble link type. By the term "polyalkylene oxide polycarboxylate" is meant polycarboxylate main chain comb copolymers having grafted side chains of polyalkylene oxide.

The term "ester level" of a polymer means the proportion of the monomer units of the main chain carrying an ester function defined by the formula below:

$$O—R1*$$

wherein R1 denotes a group having at least one carbon atom through which it is linked to the ester function and * oxygen atom symbolizes the main chain. R 1 may in particular be an alkyl group or a graft of polyalkylene oxide. The ester level is expressed as a molar percentage and is calculated by dividing the number of ester functions on the main chain by the total number of monomer units on the main chain.

By way of example, the hydraulic binder may be a Portland cement. It can be a CEM I, CEM II, CEM III, CEM IV or CEM V cement according to the "Cement" NF EN 197-1 standard.

The term "SiC" refers to silicon carbide. Industrial production of SiC can be achieved by high temperature treatment of organic materials such as agricultural waste husks.

The term "CNT" refers to carbon nanotubes. In a preferred non-limiting embodiment, the CNTs have a diameter from 20-40 nm and a length from 0.5-40 nm.

The term "MWCNT" refers to multi-walled carbon nanotubes. In a preferred non-limiting embodiment, the MWCNTs have a diameter from 20-40 nm and a length from 0.5-40 nm. Multi-walled carbon nanotubes (MWCNTs) are a special form of carbon nanotubes in which multiple single-walled carbon nanotubes are nested inside one another. MWCNTs have the unique properties that are seen within single-walled and double-walled carbon nanotubes but also have increased dispersability compared to single walled carbon nanotubes, resulting in the reduced cost in synthesis and purification of these materials.

The term "silica" refers to silicon dioxide.

Example—Process with Recycled Glass

Referring now to FIG. 4, wherein FIG. 4 shows another non-limiting preferred embodiment wherein first, the glass recycling waste is milled to a powder. In some embodiments, the recycled glass is milled to a powder and is then subjected to further separation, such as using a wire mesh to achieve a preferred 2.5-6.0 micron size. Wire mesh having a grid of 50×50 per inch can sort and separate glass powder at 200 micron. Wire mesh having a grid of 110×110 per inch can sort and separate glass powder at about 100 micron. Wire mesh having a grid of 250×250 per inch can sort and separate glass powder at 40 micron. Wire mesh having a grid of 400×400 per inch can sort and separate glass powder at 25 micron. Wire mesh having a grid of 635×635 per inch can sort and separate glass powder at 20 micron. Laser sorting can select smaller diameters. The recycled glass powder is added, along with cenospheres, silica fume, and silica flour, to the dry mix of mixed sand, and cement.

Recycled Glass Powder

Glass powder acts as a slow pozzolan. Recycled glass powder (GP) is available from subjecting glass in glass recycling processes to specialty grinding. Recycled GP functions as a partial cement replacement. The invention contemplates recycled GP 2.5-6.0 micron as a cement replacement from 5.0-7.0 weight %. In another preferred embodiment, the recycled GP as a cement replacement from 1-10 weight %. In another preferred embodiment, the recycled GP as a cement replacement from 5-25 weight %. In another preferred embodiment, the recycled GP as a cement replacement from 2-15 weight %.

Recycled Glass Powder Milling

Glass is one of the more difficult materials to process as it has a high hardness (Mohs hardness of ~5.5 to 7) and sharp edges upon fracture. Durable, field-proven, equipment and techniques are required for successful glass grinding, especially for ultra-fine milling requirements. For high quality, ultra-fine, glass powder production, the invention contemplates recycled glass powder produced from a specialty ball mill, such as the Alpine Super-Orion Ball Mill in circuit with an Air Classifier available from Hosokawa Micron Powder Systems. For preparing recycled glass powder applications, the ball mill will typically be constructed with hardened, high chrome, steel media and ball mill lining. A second option would be Aluminum Oxide media and lining.

For a second component of recycled glass powder 20-200 micron, the invention contemplates using recycled glass powder obtained using an air classifier, such as that available from Hosokawa, the Hosokawa Alpine Stratoplex (ASP) which is used for a cut point (top size) of 20 to 200 microns, or the Hosokawa Alpine Turboplex (ATP) air classifier is used for super fine applications with a cut point (top size) of 5 to 50 microns, with single and multi-wheel options. Both classifiers are made with Aluminum Oxide classifier wheels, with an interior Aluminum Oxide tiling. This allows for fine grinding and durability.

Recycled Glass Powder Size

Preferably, the recycled glass powder comprises an average cut-point particle size (D50) of about 2.5-6.0 microns. In another preferred embodiment, the recycled glass powder has an average particle size (D50) of about 4.0 microns. In another preferred embodiment, the recycled glass powder has an average particle size (D50) of about 6.0 micron, such as that available from Vitro Minerals CS 400 at www-.matweb.com. In another preferred embodiment, the invention includes a second component of recycled glass powder having has an average particle size (D50) of about 5-50 microns, such as that available from Mo-Sci corporation, e.g. 10 micron glass catalog GL0804P. In another preferred embodiment, the second component of recycled glass powder comprises has an average particle size (D50) of about 20-200 microns. Glass powder is available through industrial suppliers such a Ferro corporation.

Recycled Glass Powder Wire Mesh

For the second component of recycled glass powder, wire mesh having a grid of 50×50 per inch can sort and separate glass powder at 200 micron. Wire mesh having a grid of 110×110 per inch can sort and separate glass powder at about 100 micron. Wire mesh having a grid of 250×250 per inch can sort and separate glass powder at 40 micron. Wire mesh having a grid of 400×400 per inch can sort and separate glass powder at 25 micron. Wire mesh having a grid of 635×635 per inch can sort and separate glass powder at 20 micron. Wire mesh may be obtained at a suitable mesh supplier such as Hole Metals at www.holemetals.com.

Recycled glass powder has major oxide components comprising SiO2, Na2O, and CaO. In a preferred embodiment, the invention may contemplate recycled GP having weight % chemical composition comprising about: Na2O 10.13%, MgO 1.17%, Al2O3 2.51%, SiO2 69.43%, P2O5 0.15%, SO3 0.84%, K2O 1.15%, CaO 11.93%, and Other 1.38%.

Example—Use of Recycled Glass Powder with Other Microinclusions

Recycled glass is milled to a powder. The recycled glass powder is added, along with cenospheres, silica fume, and silica flour, to the dry mix of mixed sand, and cement, along with optional carbon nanotubes, multi-walled carbon nanotubes, and/or silicon carbide powder.

One source of the CNT, MWCNT and SiC is from milled agricultural waste. The milled agricultural waste powder is combined with recycled glass powder in a ratio to optimize desired features of the UHPC dry mix. For the CNTs and SiC, the milled agricultural waste starting material is added to a stainless steel tube furnace and the atmosphere is converted to a vacuum or to an argon atmosphere. The tube furnace is heated to a temperature of 1300-1900° C. for at least 10 minutes. The tube furnace is cooled and the SiC containing powder contents are removed for processing to purify the SiC and separate any remaining MWCNTs. The inner surface of the tube furnace is treated with acid and/or mechanical scraping to remove the MWCNT containing black powder. Solvents may be used to remove carbon impurities such as fullerenes. Additional processing of the MWCNT containing black powder is performed to purify the MWCNTs from the black powder.

Example—Use of Microinclusions (mwCNTs, SiC, UHMWPE) in Ultra High Performance Concrete Referring now to FIGS. 3 and 4, MWCNTs made according to the invention herein can be used in the manufacture of ultra high performance concrete. In one non-limiting example, the composition and method may comprise mixing a group of first constituents that are dry-mixed with microinclusions, followed by mixing with a group of second constituents.

For ultra high performance concrete, first constituents may comprise (i) cement of Blaine fineness of about 280 to about 360 m2/kg; (ii) sand, wherein said sand is provided at 28-32% by weight of said ultra high performance concrete; (iii) a dry mixture of constituents consisting of 2.5-6.0 micron recycled glass powder, silica fume, silica flour, cenospheres; and optionally (iv) microinclusions, and wherein said first constituents are mixed to yield a dry UH PC mix; and wherein wet constituents comprise (vi) water; and (vii) at least one high-range water-reducing admixture; wherein said water is mixed into said first dry mix to form a uniform cement-containing paste, and said high-range water-reducing admixture is added after the water to control the reaction; wherein said steel microfibers are mixed into said uniform cement-containing paste such that said steel microfibers are distributed approximately uniformly in a resultant cement-containing paste, and wherein said resultant cement-containing paste is hydrated.

Any of the ultra high performance concrete embodiments may also optionally include microinclusions, wherein said microinclusions are mixed with said first constituents to yield said first homogeneous mix, including wherein said material for formation of said microinclusions are selected from the group consisting of: metals, alloys, steel, synthetics, polymers, natural inorganics, minerals, glass, asbestos, carbon, cellulose, synthetic organics, natural organics, sisal, and combinations thereof.

Any of the ultra high performance concrete embodiments may include wherein said cement is portland cement with a calcium to silica ratio of less than about 3.1, wherein said silica is at least 96% silica with a maximum carbon content of less than about 4%, and wherein said silica is crushed silica of less than about 40 microns in its longest dimension.

Any of the ultra high performance concrete embodiments may include wherein said microinclusions are of lengths between about 18 to about 38 mm and in diameters between about 0.38 to about 0.63 mm, wherein said microinclusions incorporate ends selected from the group consisting of: hooked ends, approximately straight ends, bulbed ends, and combinations thereof, wherein said microinclusions have a surface selected from the group consisting of: silica bonded to said surface, glass frit bonded to said surface, a roughened surface, and combinations thereof, and wherein may include microinclusions selected from the group consisting of: fiber microinclusions, spherical microinclusions, polyhedron microinclusions, and combinations thereof, and/or wherein said microinclusions have a longest dimension from about one micron to about 150 microns, and/or nanoinclusions that are included in said first constituents to yield said first homogeneous mix, and/or wherein said nanoinclusions are selected from the group consisting of: fiber nanoinclusions, spherical nanoinclusions, polyhedron nanoinclusions, and combinations thereof, and/or said nanoinclusions are fabricated are selected from the group consisting of: carbon nanotubes, colloids, colloidal silica, and combinations thereof, and/or said microinclusions are fabricated are selected from the group consisting of: metals, ceramics, organics, natural inorganics, natural minerals, synthetics, and combinations thereof, and/or said microinclusion materials are selected from the group consisting of: steel shavings, ceramic whiskers, ceramic spheres, mineral fibers, wollastonite, carbon fibers and combinations thereof.

Any of the ultra high performance concrete embodiments may further comprising mats of steel strands of diameter less than about 2.5 mm affixed to a tensile-load carrying face of said structure.

Any of the ultra high performance concrete embodiments may include wherein high-range water-reducing admixture comprises polycarboxylates, wherein said amount is in the range of about three to about 20 fluid ounces per 100 lb of said resultant cement-containing paste.

Any of the ultra high performance concrete embodiments may include wherein said cement-containing paste is a stiff dough with approximately zero slump, or wherein said cement-containing paste is a flowable mixture.

Referring now to FIG. 5, the process of forming an article is provided. Any of the ultra high performance concrete embodiments may include:

STEP 1. Prepare ultra high performance concrete: mixing sand (fine aggregate) 28-32 weight %, portland cement 28-32 weight % having of Blaine fineness of about 280 to about 360 m2/kg, and a dry mixture of constituents consisting of 2.5-6.0 micron recycled glass powder 5.0-7.0 weight %, silica fume 12-14 weight %, silica flour 7.0-9.0 weight %, cenospheres 10-25%, and optionally microinclusions consisting of carbon nanotubes, ultra-high molecular weight polyethylene fibers, multi-walled carbon nanotubes, and silicon carbide, to yield a homogenous UHPC dry mix, then first mixing water into the homogenous UHPC dry mix, followed by mixing a superplasticizer admix and a water-reducing admix to form a UHPC cement-containing paste of uniform plasticity, and finally mixing steel microfibers to the UHPC cement-containing paste of uniform plasticity to obtain a steel-microfiber reinforced UHPC cement mix, wherein a total of all weight % equals 100%, and wherein mixing time is 5-10 minutes;

STEP 2. Forming the ultra high performance concrete into an article; and

STEP 3. Curing said article, with optional heat, hydration, and voltage.

Any of the ultra high performance concrete embodiments may include wherein the cement structure is a component selected from the group consisting of: overlays, joint fills, beam end-caps, plates, channels, pipes, tubes, I-beam sections, H-beam components, WF-sections, smooth columns, fluted columns, connectors, panels, vehicle up-armoring, ballistic armor, blast-resistant panels, man-portable panels, thin armor panels, forced entry resistant structural elements, wall panels, roofing tiles, floor tiles, kitchen and bath countertops, laboratory bench tops, hurricane and tornado resistant structural walls, panels, and supports, bollards, planters, sea-wall components, drainage tiles, pipes and ditch components, underflooring, wall tiles, stepping stones, planters, pavers, trusses, joists, rafters, support gussets, decking, footers, mounting pads, post and pole anchor blocks, precast water conduit, precast sewage pipes, precast pipe connectors, concrete blocks, bricks, refractory bricks, fireplace liners, veneers, oil and gas well cementing for casings, seawalls, sea barrier blocks and forms, undersea pilings, undersea mounting pads, harbor docks, precast highway slabs, precast railroad ties, precast parking blocks, precast jersey barriers, street curbs, sidewalks, driveways, drive aprons, warehouse flooring slabs, storage tank pads, power station towers, and power station dams.

Any of the embodiments herein may include wherein said components are employed to fabricate items selected from the group consisting of: vehicle up-armoring, ballistic armor, blast-resistant panels, man-portable panels, thin armor panels, forced entry resistant structural elements, armored roofing tiles, ballistic wall panels, ballistic floor tiles, hurricane and tornado resistant structural elements, and combinations thereof.

Any of the methods of making ultra high performance concrete forms may be made by techniques selected from the group consisting of: spin casting, extrusion molding, pressure molding, pouring into forms, and combinations thereof.

Any of the method of making ultra high performance concrete forms wherein said composition component is cured by: placing in an environment of approximately 100% relative humidity for about seven days at ambient temperature, submersing in water of approximately 85° C. to about 91° C. for about three to about five days, and heating in air at approximately 85° C. to about 91° C. for about one to about two days, wherein said cured composition component becomes crystalline unlike said composition components cured under ambient conditions as an amorphous calcium silicate hydrate.

Microinclusion Treatment

Any of the microinclusions used herein may be subject to plasma etching treatment, plasma cleaning treatment, and/or plasma surface modification. Plasma treatment is a surface modification technique that readily primes any surface for better acceptance of secondary manufacturing applications. Plasma is a reactive treatment process where positive and negative ions, electrons, and radicals react and collide as long as an electric potential difference exists. Some plasma treatments use low pressure, or vacuum plasma, for more consistent and longer-lasting surface treatments. By plasma treating microinclusions, the invention provides microscopically changed surfaces for improved bonding, micro-cleaned microinclusions to enhance the surface wetting of adhesives or over-molded elastomers, functionalized groups (carbonyl, hydroxyl and others) to improve surface energy, and the establishment of hydrophobic and hydrophilic properties. Plasma cleaned microinclusions avoids the use of environmentally unfriendly cleaning chemicals in addition to e.g. trichloroethylene. Plasma cleaning offers significant advantages over wet cleaning methods alone and removes organic contamination, renders surfaces more hydrophilic, and improves adhesion. Argon plasma micro-sandblasting is contemplated as a plasma treatment herein. Hydrogen plasma plasma treatment is also contemplated for removal of surface oxides on the recycled steel fibers. Helium, Nitrogen, and Oxygen plasma treatments are included within the scope of the invention. For plasma CVD surface modification, functionalized groups can be added to the cleaned surface of the microinclusions using plasma enhanced chemical vapor deposition to coat the microinclusions with layers of carbon, silicon, carbon nanotubes, silicon carbide, silicon nitride, and so forth. For a plasma wetting layer, improving wettability of the microinclusions is also an aspect of plasma treatment included herein. Use of plasma treatment to modify the surface energy of the surface of the microinclusions increases the mixability of the microinclusions in the composition. Examples of modifying the surface energy includes deposition of ultra-thin layers by plasma to adjust wetting properties, using siloxane-based or fluorocarbon films.

Composition Toughness

In select embodiments of the present invention, structures and components are built using a superior composition, providing a combination of high strength and superior energy absorbing capacity. Toughness is a measure of the amount of energy required to be expended to open cracks in the matrix under tensile loading. It is an important metric for objects that suffer impact.

Select embodiments of the present invention provide formulations and methods of fabrication for producing an optimum combination of increased strength and toughness in a custom composition that may be formulated with plasma treated fibers.

Consistency Modifiers

Select embodiments of the present invention may incorporate high-performance materials such as woven mats of small diameter high-strength wire comprising steel or synthetics such as carbon fiber, fiberglass, and aramids, to further enhance performance. In select embodiments of the present invention, un-hydrated cement-based paste may be mixed in a "dough-like" consistency enabling it to be extrusion molded, spun-cast, or formed under external pressure into shapes suitable for protective applications, such as components for improving blast resistance of structures, for fabricating inexpensive alternatives to ceramic armor, and the like. This stiff mixture holds its shape during production and curing without the need of formwork, enabling it to be produced on an assembly line.

Because of superior performance, select embodiments of the present invention are suitable for commercial use as structural members and resistant panels. Select embodiments of the present invention obtain superior strength and toughness qualities through, among other considerations, proper selection of the type and quantity of constituents, including macro-, micro- and nano-sized inclusions of specified composition.

Macro- and microfiber reinforcement contributes to an optimum combination of strength and toughness. Macro-fibers address bridging of macro-cracks and micro-fibers address bridging of micro-cracks.

Example—Specific Mixtures

Initial mixes of select embodiments of the present invention comprise: a cement of Blaine fineness at about 280 to about 360 m2/kg; sand at a mass ratio of about 0.75 to about 1.25 of the mass of cement; at least one high-range water-reducing admixture (HRWRA), such as GLENIUM® 3030 NS, Degussa Admixtures, Inc.; ADVA® 170 and ADVACAST® 500, W.R. Grace & Co., and PLASTOL, EUCON 37 and EUCON 1037, Euclid Chemical Co., in amounts approximately commensurate with the recommendations of the manufacturer; recycled glass powder.

Optional Additional Fibers

Besides recycled glass powder, optional additional fibers include carbon nanofibers, mineral fibers (e.g., glass or asbestos), optional synthetic organic fibers (e.g., carbon, cellulose, or polymeric), optional natural organic fibers (e.g., sisal) at a mass ratio of up to about 0.35 of the mass of cement; and water at a mass ratio of about 0.2 to about 0.35 of the mass of cement.

In select embodiments of the present invention, an HRWRA may be added in specified amounts of about 3-20 fluid ounces per 100 lbs of the cement-based paste.

Example—Mix Variations

For select embodiments of the present composition, constituents may vary within the initial mix.

For example, the cement may be portland cement of high-silica content, i.e., a calcium to silica ratio (Ca/Si) of less than about 3.1. Microinclusions consist of recycled glass powder.

The composition may also contain optional synthetic fibers, polymer fibers, organic fibers, natural inorganic fibers, and the like, and combinations thereof.

Microinclusion Size

Preferably, microinclusions are provided in lengths between about 18 to about 38 mm (0.75-1.5 in.) and in diameters between about 0.38 to about 0.63 mm (0.015-0.025 in.). The ends of the microinclusions may be hooked, straight, or "bulbed." Special treatment of the microinclusions, such as bonding silica or glass frit to the surface or roughening the surface, enhances the bond between the cement-based paste and the microinclusions.

Mats comprising continuous, high-strength steel strands of diameter less than about 2.5 mm (0.1 in.) may be embedded in or bonded to the tensile-load carrying face of the mix to add strength and toughness. The high-range water-reducing admixture (HRWRA) may be a polycarboxylate type material, added in amounts approximating recommendations of the manufacturer.

Inclusions

In select embodiments of the present invention, microinclusions, also termed dispersions, are incorporated to increase the toughness of the mix (cement-based paste) at the micro (or nano) scale by acting as micro-crack bridging mechanisms that truncate or delay the growth of micro cracks in the mix and at the nanoscale by filling the void spaces between larger particles making the material more dense. Microinclusions may be selected from the group comprising: fiber-like microinclusions, spherical microinclusions, polyhedron microinclusions, fiber-like nanoinclusions, spherical nanoinclusions, polyhedron nanoinclusions, and the like, and combinations thereof. In select embodiments of the present invention, microinclusions may have a longest dimension from about one micron to about 150 microns.

Microinclusions may be selected from the group of materials comprising: metals, ceramics, organics, natural minerals, and the like, and combinations thereof. Specific configurations of these microinclusion materials may be selected from the group comprising: steel shavings, ceramic whiskers, ceramic spheres, mineral fibers, wollastonite, carbon fibers, carbon nanotubes, and the like, and combinations thereof. Further, microinclusions may be selected from the class of materials of a colloidal nature such as colloidal silica.

Flow Modifiers

In select embodiments of the present invention, the rheology of the constituents in the mix may range from highly flowable to that of stiff dough or clay, depending on the concentration of each of the constituents. The rheology of a particular mix is dependent on the volume and surface area of dry constituents (including the microinclusions and select nanoinclusions), the volume of water, and the mass of the mixing them in the dry state for about 1-5 minutes. The water is then added first to the dry ingredients as the mixer is operating, and the admix is added after the water to control the reaction. Mixing continues to yield a plastic cement-based ultra high performance concrete paste. The steel-microfibers are then added to the plastic cement-based ultra high performance concrete paste. Total mixing time is 5-10 minutes.

COMPARATIVE EXAMPLES

| Type of composition | psi | invention |
|---|---|---|
| Mortar | 1200 | |
| Concrete | 3000-4000 | 4,000-21,500+ |

| Failures | psi | invention | microfiber concrete psi |
|---|---|---|---|
| Wrong admix | 3000-4000 | Correct admix | 4,000-21,500+ |
| Lacking steel microfibers | 3000 | incl. Steel microfibers | 4,000-21,500+ |
| Large macro fibers | 4000 | macroinclusions | 4,000-21,500+ |
| Wrong sand, impurities | <3000-4000 | clean, sized sand | 4,000-21,500+ |
| Mixing admix before water | 4000 | correct process | 4,000-21,500+ |
| Mix all in one | clumps, | correct sequence | 4,000-21,500+ |
| Amorphous | | not amorphous | |
| Lacking CNT | 3000-4000 | incl. CNT | 4,000-21,500+ |
| Not curing | 3000-4000 | incl. | 4,000-21,500+ |
| Joule heating | | | |
| Using chloride admix | <3000 (oxidizes) | | |
| Large aggregate | 3000-4000 large pores, too porous | | |

HRWRA used. For example, a stiff dough-like mixture suitable for extruding or spin-casting contains a relatively high volume of dry constituents, a relatively low volume of water and a relatively moderate to low mass of an HRWRA. Conversely, a flowable mixture contains a relatively low volume of dry constituents, a relatively high volume of water and a relatively high mass of an HRWRA.

For mixing select embodiments of the present invention, equipment for making "stiff" mixtures comprises a shear-type mixer, such as a paddle or star-wheel mixer. These impart high-shear energy to the wetted constituents, readily converting them into a cement-based paste, albeit a stiff paste. The greater the shear-imparting energy imparted to the constituents in mixing, the quicker they form into a cement-based paste. For mixing select embodiments of the present invention, equipment for making "flowable" mixtures may be conventional drum-type mixers or the above high-shear mixers.

Example—Mixing Process

In select embodiments of the present invention, the process comprises loading dry constituents, into the mixer and Example—Molds and Forms Referring to FIG. 6, in select embodiments of the present invention, the steel-microfiber UHPC-based paste is placed in molds to hydrate (harden). In select embodiments of the present invention, the molding procedure depends on the rheology of the final cement-based paste. Flowable cement-based pastes are placed or poured into molds that contain the cement-based paste until it hydrates.

In select embodiments of the present invention, fluid steel-microfiber UHPC-based paste may be vibrated by placing molds filled with steel-microfiber UHPC-based paste on an external vibrating table and vibrating the mold and steel-microfiber UHPC-based paste as a unit, or by inserting internal vibrators into the steel-microfiber UHPC-based paste and vibrating until it is consolidated. Vibration frees entrapped air voids from the steel-microfiber UHPC-based paste and consolidates solid constituents into a tightly packed configuration.

In select embodiments of the present invention, "stiff" mixtures of the steel-microfiber UHPC-based paste are shaped by pressure molding, extrusion molding, or spin casting. In select embodiments of the present invention, pressure molding comprises rolling or pressing a dough-like steel-microfiber UHPC-based paste into a prepared mold or pressing a dough-like steel-microfiber UHPC-based paste to a given thickness as in the case of making plates or tiles. In select embodiments of the present invention, placing a dough-like steel-microfiber UHPC-based paste into an extruder and applying pressure to force it through the die yields a final molded shape. Extruded product may need to be supported until it hardens to prevent it from changing shape. In select embodiments of the present invention, spin casting involves placing a dough-like steel-microfiber UHPC-based paste along the longitudinal axis of the inside of a mold and spinning the mold at high speed to distribute the steel-microfiber UH PC-based paste evenly over the inside of the mold with the centrifugal force created by the spinning.

In select embodiments of the present invention, the molded, extruded or spun-cast steel-microfiber UHPC-based paste is left in the mold or supported in the extruded or spun-cast shape until it has hydrated. This is normally 24 hours, but may be longer depending on the amount of the HRWRA specified for the formulation. In select embodiments of the present invention, product is not removed from the mold until it has achieved a stiffness that resists deformation under moderate force, such as thumb pressure.

Example—Curing

Referring to FIG. 6, in select embodiments of the present invention, curing may be done by conventional methods such as water or steam curing or by applying a curing compound for the same length of time as conventional cement-based paste is cured. However, conventional curing methods may not yield an optimum combination of strength and toughness. To achieve a desired combination, in select embodiments of the present invention, the hydrated but not fully cured, steel-microfiber UHPC-based paste is heated. In select embodiments of the present invention, prior to heating, the steel-microfiber UHPC-based paste is cured for about seven days in an environment of approximately 100% relative humidity at ambient temperature, approximately 21° C.±3° C. (70° F.±5° F.), submersed in water at approximately 88° C.±3° C. (190° F.±5° F.) for about three to about five days, and heated in air at approximately 88° C.±3° C. (190° F.±5° F.) for about one to about two days. This process configures amorphous calcium silicate hydrate as a structure that is more like a crystalline structure than the original calcium silicate hydrate.

As shown, select embodiments of the present invention provide a composition that is both strong and tough for fabricating superior building components. These superior components may be made in any shape through form casting while conventional structural shapes may be made by either mold extrusion or spin-casting.

Example—Voltage Curing—CNT Heated Panels and Forms

Referring to FIG. 6, for commercial or residential users: embedding carbon nanotubes (CNTs) and steel microfibers in ultra high performance concrete and creating a uniformly distributed CNT-and-Steel-microfiber-ultra high performance concrete provides an opportunity to configure a voltage supply to the CNT-and-Steel-microfiber-ultra high performance concrete to provide voltage curing of the embedded CNTs and Steel microfibers.

Additionally, after curing, configuring a voltage supply to the cured CNT-and-Steel-microfiber-ultra high performance concrete provides a heat-producing CNT-and-Steel-microfiber-ultra high performance concrete article.

In a preferred embodiment, the CNTs are amorphously cross-linked with steel microfibers in a microfiber concrete+ steel fiber+CNT component. In one preferred aspect, the concentration of CNT and steel microfiber in the microfiber concrete ranges from 5-10% steel microfiber, and 2-4% CNT, preferably MWCNTs from agricultural sources at 2%.

In another preferred embodiment, the ultra high performance concrete includes a voltage delivery mesh or feeder wires to provide voltage to CNTs that are cross-linked with steel microfibers in a mesh-fed microfiber concrete+steel fiber+CNT component.

Components include: building construction products, such as roofing tiles, wall panels, floor tiles, and the like, and lightweight structural shapes such as plates, channels, pipes, tubes, I- and WF-sections, and the like.

Example—Use as Armor

Select embodiments of the present invention are suitable for fabricating inexpensive structural panels, such as thin armor panels that may be used for vehicles as well as fixed structures. Structural armor panels may be formed or extruded to a thickness heretofore impractical because of the improved toughness and strength of embodiments of the present invention. For example, panels may be produced in size and thickness to accommodate man-portability. These man-portable panels may be configured for attaching to a structural framework to resist penetration of small arms fire and mitigate blast and fragmentation effects.

An embodiment of the present invention, configured appropriately, offers an inexpensive solution for force protection in addition to man-portable products. For the military and government applications: very high performance composition incorporated in inexpensive ballistic armor; light weight structural shapes such as plates, channels, pipes, tubes, I- and WF-sections; connectors; protective construction; blast-resistant panels; fragmenting munitions protection; vehicle up-armoring; forced entry resistant structural elements and the like.

Example—Commercial Construction

For commercial or residential construction, the ultra high performance concrete is used to manufacture components are selected from the group consisting of: overlays, joint fills, beam end-caps, plates, channels, pipes, tubes, I-beam sections, H-beam components, WF-sections, smooth columns, fluted columns, connectors, panels, vehicle up-armoring, ballistic armor, blast-resistant panels, man-portable panels, thin armor panels, forced entry resistant structural elements, wall panels, roofing tiles, floor tiles, kitchen and bath countertops, laboratory bench tops, hurricane and tornado resistant structural walls, panels, and supports, bollards, planters, sea-wall components, drainage tiles, pipes and ditch components, underflooring, wall tiles, stepping stones, planters, pavers, trusses, joists, rafters, support gussets, decking, footers, mounting pads, post and pole anchor blocks, precast water conduit, precast sewage pipes, precast pipe connectors, concrete blocks, bricks, refractory bricks, fireplace liners, veneers, oil and gas well cementing for casings, seawalls, sea barrier blocks and forms, undersea pilings, undersea mounting pads, harbor docks, precast highway slabs, precast railroad ties, precast parking blocks, precast jersey barriers, street curbs, sidewalks, driveways, drive aprons, warehouse flooring slabs, storage tank pads, power station towers, and power station dams.

Additional components may be manufactured to fabricate items selected from the group consisting of: vehicle up-armoring, ballistic armor, blast-resistant panels, man-portable panels, thin armor panels, forced entry resistant structural elements, armored roofing tiles, ballistic wall panels, ballistic floor tiles, hurricane and tornado resistant structural elements, and combinations thereof.

Example—Heated Panels and Forms

Referring again to FIG. 6, for commercial or residential users: the ultra high performance concrete can be connected to a voltage supply to generate voltage heating of the embedded microfibers and provide heated ultra high performance concrete components.

In a preferred embodiment, the microfibers are amorphously cross-linked within the UH PC.

In another preferred embodiment, the ultra high performance concrete includes a voltage delivery mesh or feeder wires to provide voltage to microfibers in a mesh-fed microfiber concrete+microfiber component.

FIG. 7 is an image of an H pile constructed using the steel microfiber reinforced ultra high performance concrete herein. FIG. 7 shows that pre-cast forms can be used for many types of construction projects.

FIG. 8 is a table of ultra high performance concrete constituents, packaging, and yield. FIG. 8 is a non-limiting example of an ingredient list for use in preparing the ultra high performance concrete herein.

FIG. 9 is an image of a precast form (wall) made from a unitary pour of ultra high performance concrete. FIG. 9 shows that pre-cast forms can be used for many types of construction projects, including walls having decorative features.

FIG. 10 is an image of a mobile processing plant. FIG. 10 shows a mobile trailer having hopper bins connected by feeders/augers for sand, cement, ultra high performance concrete additive, and microfibers, as well as containers for dispensing admix and water. Super sacks containing specific components are loaded into the appropriate hopper and transported to a central mixing container. All of the required components of the mobile processing plant can be transported to a specific location reducing the need to mix offsite and transport ultra high performance concrete to the pour location.

Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described. Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

It is therefore to be understood that within the scope of the appended claims, the invention may be practiced otherwise than as described. Accordingly, all such modifications are intended to be included within the scope of this invention as defined in the following claims.

What is claimed as the invention:

1. A process for making a microfiber-containing hydrated ultra high performance concrete (UHPC) paste, comprising:
   (i). preparing a UHPC dry mix by mixing sand 28-32 weight %, cement 28-32 weight % having a Blaine fineness of about 3000-4500 cm$^2$/g, silica fume 12-14 weight %, silica flour 7.0-9.0 weight %, and microinclusions, wherein the microinclusions are selected from one or more the group consisting of 2.5-6.0 micron recycled glass powder, cenospheres, ceramic spheres, steel shavings, ceramic whiskers, mineral fibers, wollastonite, ultra-high molecular weight polyethylene (UHMWPE) microfibers, and carbon fibers;
   (ii). preparing a hydrated UHPC paste by mixing water into the UHPC dry mix, followed by mixing a high-range water-reducing admixture (HRWRA); and
   (iii). mixing steel microfibers 13 mm×0.2 mm, 5-10% weight % into the hydrated UHPC paste to obtain a hydrated microfiber UHPC paste;
   wherein a total of all weight % equals 100%.

2. The process according to claim 1, wherein total mixing time is 5-10 minutes.

3. The process according to claim 1, wherein said high-range water-reducing admixture is a combination of two or more admixtures selected from a superplasticizer liquid admixture, a water-reducing liquid admixture, and mixtures thereof, and wherein the high-range water-reducing admixture combination has a density of 1.04-1.06 g/cc.

4. The process according to claim 1, wherein the microinclusions are 1.0-25.0 weight %.

5. The process according to claim 1, wherein the process is performed in a redi-mix truck at a volume of 8-11 cu. yds.

6. The process according to claim 1, wherein the process is performed in a stationary mixer at a volume of 1-3 cu. yds.

7. A microfiber-containing hydrated ultra high performance concrete (UHPC) paste made according to the process of claim 1.

8. The process of claim 1, comprising the step of forming the hydrated microfiber UHPC paste into an article.

9. An article made according to the process of claim 8.

10. The article according to claim 9, wherein the article is a component selected from the group consisting of: an overlay, a joint fill, a beam end-cap, a plate, a channel, a pipe, a tube, an I-beam section, an H-beam component, a wide-flange (WF) section, a smooth column, a fluted column, a connector, a panel, a vehicle armor, a ballistic armor, a blast-resistant panel, a portable panel, a thin armor panel, a forced entry resistant structural element, a wall panel, a roofing tile, a floor tile, a kitchen and bath countertop, a laboratory bench top, a hurricane and tornado resistant structural wall, a bollard, a planter, a sea-wall component, a drainage tile, a pipe and ditch component, an underflooring, a wall tile, a stepping stone, a planter, a paver, a truss, a joist, a rafter, a support gusset, a decking, a footer, a mounting pad, a post and pole anchor block, a precast water conduit, a precast sewage pipe, a precast pipe connector, a concrete block, a brick, a refractory brick, a fireplace liner, a veneer, an oil and gas well casing, a seawall, a sea barrier block and form, an undersea piling, an undersea mounting pad, a harbor dock, a precast highway slab, a precast railroad tie, a precast parking block, a precast jersey barrier, a street curb, a sidewalk, a driveway, a drive apron, a warehouse flooring slab, a storage tank pad, a power station tower, and a power station dam.

11. The article according to claim 9, wherein the article is a component selected from the group consisting of: a vehicle armor component, a ballistic armor component, a blast-resistant panel, a portable panel, a thin armor panel, a forced entry resistant structural element, an armored roofing tile, a ballistic wall panel, a ballistic floor tile, a hurricane and tornado resistant structural element, and combinations thereof.

12. The article according to claim 10, further comprising mats of steel strands of diameter less than about 2.5 mm affixed to a tensile-load carrying face of said article.

13. The process according to claim 1, comprising forming said hydrated microfiber UHPC paste in the shape of a component, and curing said component by heating and/or hydrating with heating, and/or applying voltage to cure said component.

14. The process according to claim 13, comprising curing said component by: (i) placing in an environment of approximately 100% relative humidity for about seven days at ambient temperature, (ii) submersing in water of approximately 85° C. to about 91° C. for about three to about five days, and (iii) heating in air at approximately 85° C. to about 91° C. for about one to about two days, wherein, said cured composition component becomes crystalline and has a compressive strength of at least 4,000-21,500 psi.

15. A heat-cured component made according to the process of claim 13.

16. The article according to claim 9, wherein the article has wire connectors connected to the steel microfibers for providing a voltage-heating voltage supply to generate a heated ultra high performance concrete article.

17. The article of claim 16, wherein the heated ultra high performance concrete article is selected from one of the group consisting of: a heated floor tile, a heated wall panel, a heated roofing tile, a heated sidewalk, and a heated bridge deck.

\* \* \* \* \*